(12) United States Patent
Sabae et al.

(10) Patent No.: US 8,587,756 B2
(45) Date of Patent: Nov. 19, 2013

(54) LAMINATED OPTICAL FILM HAVING A POLARIZER AND TWO OPTICAL COMPENSATION LAYERS, AND LIQUID CRYSTAL PANEL AND LIQUID CRYSTAL DISPLAY APPARATUS USING THE LAMINATED OPTICAL FILM

(75) Inventors: Misaki Sabae, Osaka (JP); Masatoshi Tomonaga, Osaka (JP); Naoki Koishi, Osaka (JP); Masato Bitou, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 668 days.

(21) Appl. No.: 12/412,894

(22) Filed: Mar. 27, 2009

(65) Prior Publication Data

US 2009/0257012 A1 Oct. 15, 2009

(30) Foreign Application Priority Data

Apr. 9, 2008 (JP) ................. 2008-101440

(51) Int. Cl.
*G02B 5/30* (2006.01)
(52) U.S. Cl.
USPC .......................................... 349/118; 359/499
(58) Field of Classification Search
USPC ................ 349/96, 115, 116, 117, 118, 119
See application file for complete search history.

(56) References Cited

U.S. PATENT DOCUMENTS

| | | | |
|---|---|---|---|
| 6,208,396 B1 * | 3/2001 | Shimizu et al. ............... | 349/119 |
| 6,281,951 B1 | 8/2001 | Carpentier et al. | |
| 6,563,554 B2 | 5/2003 | Okamoto et al. | |
| 6,593,982 B2 | 7/2003 | Yoon et al. | |
| 6,717,637 B1 | 4/2004 | Yoon et al. | |
| 6,839,103 B2 | 1/2005 | Kelly et al. | |
| 6,900,863 B2 | 5/2005 | Okamoto et al. | |
| 6,930,740 B2 | 8/2005 | Yoon et al. | |
| 7,050,132 B2 | 5/2006 | Okamoto et al. | |
| 7,227,602 B2 | 6/2007 | Jeon et al. | |
| 7,394,511 B2 | 7/2008 | Okamoto et al. | |
| 7,423,714 B2 * | 9/2008 | Chiba et al. ................... | 349/119 |

(Continued)

FOREIGN PATENT DOCUMENTS

| | | |
|---|---|---|
| CN | 1441265 A | 9/2003 |
| CN | 1683972 A | 10/2005 |

(Continued)

OTHER PUBLICATIONS

Japanese Office Action date Jul. 6, 2011, issued in corresponding Japanese Patent Application No. 2008-101440.

(Continued)

*Primary Examiner* — Akm Enayet Ullah
(74) *Attorney, Agent, or Firm* — Westerman, Hattori, Daniels & Adrian, LLP

(57) ABSTRACT

A laminated optical film according to an embodiment of the present invention includes a polarizer; a first optical compensation layer which has a refractive index ellipsoid showing a relationship of nx>ny>nz; and a second optical compensation layer which has a refractive index ellipsoid showing a relationship of nz>nx>ny, wherein the polarizer and the first optical compensation layer are placed so that an absorption axis of the polarizer is parallel to or perpendicular to a slow axis of the first optical compensation layer, and the polarizer and the second optical compensation layer are placed so that an absorption axis of the polarizer is parallel to or perpendicular to a slow axis of the second optical compensation layer.

8 Claims, 11 Drawing Sheets

Equal contrast ratio contour

(56) References Cited

U.S. PATENT DOCUMENTS

| | | | |
|---|---|---|---|
| 7,462,381 B2 * | 12/2008 | Yoshimi et al. | 428/1.1 |
| 7,538,836 B2 | 5/2009 | Fujita et al. | |
| 7,557,883 B2 * | 7/2009 | Kawamoto et al. | 349/119 |
| 7,630,038 B2 * | 12/2009 | Takeda et al. | 349/117 |
| 7,738,065 B2 * | 6/2010 | Shutou et al. | 349/119 |
| 8,154,694 B2 * | 4/2012 | Bitou et al. | 349/118 |
| 2001/0007487 A1 | 7/2001 | Yoon et al. | |
| 2001/0048497 A1 | 12/2001 | Miyachi et al. | |
| 2001/0052948 A1 | 12/2001 | Okamoto et al. | |
| 2002/0047968 A1 * | 4/2002 | Yoshida et al. | 349/117 |
| 2003/0067570 A1 | 4/2003 | Okamoto et al. | |
| 2003/0164920 A1 | 9/2003 | Kelly et al. | |
| 2003/0210362 A1 | 11/2003 | Yoon et al. | |
| 2004/0160537 A1 | 8/2004 | Okamoto et al. | |
| 2005/0062917 A1 | 3/2005 | Kashima | |
| 2005/0112299 A1 * | 5/2005 | Shimizu et al. | 428/1.31 |
| 2005/0140900 A1 | 6/2005 | Jeon et al. | |
| 2005/0231660 A1 | 10/2005 | Fujita et al. | |
| 2005/0243248 A1 | 11/2005 | Yoon et al. | |
| 2006/0119752 A1 | 6/2006 | Okamoto et al. | |
| 2006/0203162 A1 * | 9/2006 | Ito et al. | 349/117 |
| 2007/0222919 A1 | 9/2007 | Chiba et al. | |
| 2007/0279553 A1 | 12/2007 | Yoda et al. | |
| 2008/0036954 A1 | 2/2008 | Takahashi et al. | |
| 2008/0170186 A1 | 7/2008 | Okamoto et al. | |
| 2009/0087650 A1 | 4/2009 | Inoue et al. | |
| 2009/0103016 A1 * | 4/2009 | Shutou et al. | 349/96 |
| 2009/0237601 A1 * | 9/2009 | Shutou et al. | 349/118 |
| 2009/0257012 A1 * | 10/2009 | Sabae et al. | 349/118 |
| 2010/0026936 A1 | 2/2010 | Uesaka et al. | |
| 2010/0045910 A1 * | 2/2010 | Bitou et al. | 349/118 |
| 2010/0277675 A1 * | 11/2010 | Higashi et al. | 349/96 |

FOREIGN PATENT DOCUMENTS

| | | |
|---|---|---|
| JP | 3-233502 A | 10/1991 |
| JP | 05-100114 B2 | 4/1993 |
| JP | 9-325212 A | 12/1997 |
| JP | 10068816 A | 3/1998 |
| JP | 11-242226 A | 9/1999 |
| JP | 2000-227520 A | 8/2000 |
| JP | 3174367 B2 | 3/2001 |
| JP | 2001-209065 A | 8/2001 |
| JP | 2002-55342 A | 2/2002 |
| JP | 2003-075635 A | 3/2003 |
| JP | 2003-270443 A | 9/2003 |
| JP | 2004-326089 A | 11/2004 |
| JP | 2006-84700 A | 3/2006 |
| JP | 2006-154436 A | 6/2006 |
| JP | 2006-195441 A | 7/2006 |
| JP | 2006-215221 A | 8/2006 |
| JP | 2006-267625 A | 10/2006 |
| JP | 2006-309130 A | 11/2006 |
| JP | 2007-034107 A | 2/2007 |
| JP | 2007-199149 A | 8/2007 |
| JP | 2007-286578 A | 11/2007 |
| JP | 2008-020670 A | 1/2008 |
| JP | 2008-129175 A | 6/2008 |
| JP | 2009-192611 A | 8/2009 |
| JP | 2009-192612 A | 8/2009 |
| JP | 2009-251442 A | 10/2009 |
| KR | 2005-0039587 A | 4/2005 |
| TW | 200801603 A | 1/2008 |
| WO | 2006-059545 A1 | 6/2006 |
| WO | 2007-086538 A1 | 8/2007 |

OTHER PUBLICATIONS

Korean Office Action dated Feb. 21, 2011, issued in corresponding Korean Patent Application No. 2009-0029977.
International Search Report PCT/JP2007/071006; Mailing date of Jan. 22, 2008.
International Search Report of PCT/JP2007/073378, Mailing date of Jan. 15, 2008.
International Search Report of PCT/JP2007/070585, Mailing date of Dec. 11, 2007.
Japanese Office Action dated Feb. 16, 2011, issued in corresponding Japanese Patent Application No. 2007-259012.
Japanese Office Action dated Apr. 27, 2011, issued in Japanese Patent Application No. 2007-259012.
Japanese Office Action dated Sep. 7, 2011, issued in corresponding Japanese Patent Application No. 2008-101440.
Taiwanese Office Action dated Mar. 25, 2013, issued in corresponding Taiwanese Patent Application No. 098110685.
Machine Translation of JP2000-227520, (Aug. 15, 2000).

* cited by examiner

Fig.3A
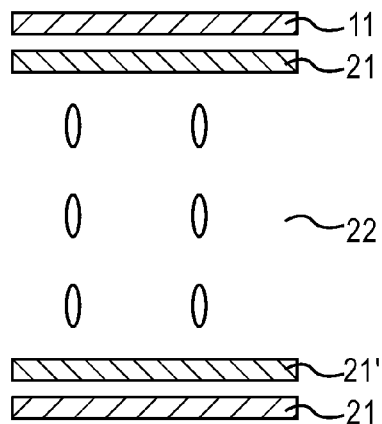
Fig.3B
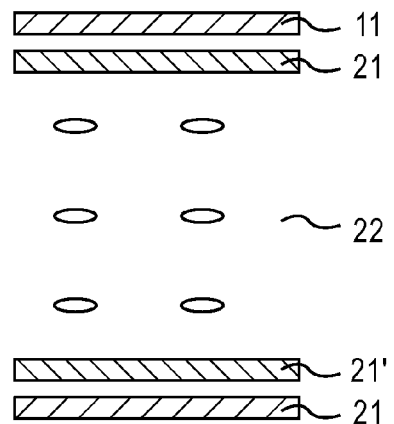
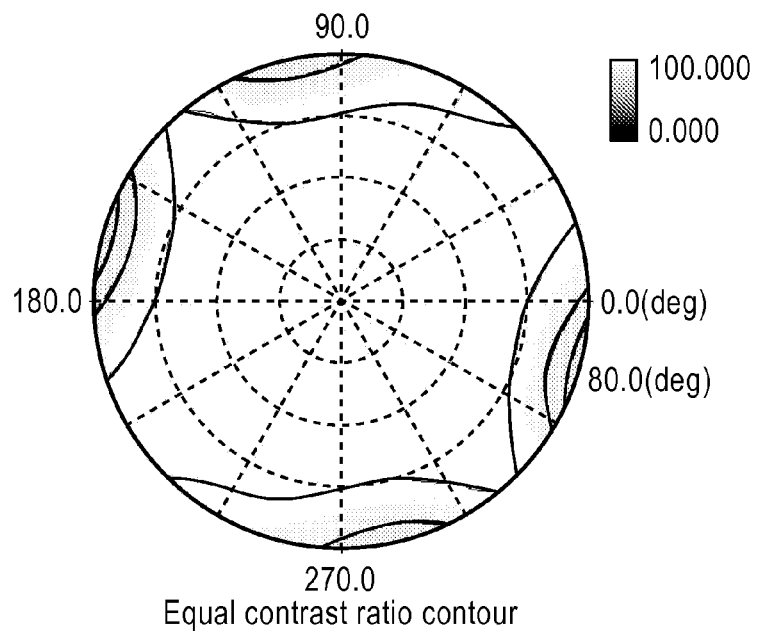
Fig.4
Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

Equal contrast ratio contour

LAMINATED OPTICAL FILM HAVING A POLARIZER AND TWO OPTICAL COMPENSATION LAYERS, AND LIQUID CRYSTAL PANEL AND LIQUID CRYSTAL DISPLAY APPARATUS USING THE LAMINATED OPTICAL FILM

This application claims priority under 35 U.S.C. Section 119 to Japanese Patent Application No. 2008-101440 filed on Apr. 9, 2008, which is herein incorporated by reference.

BACKGROUND OF THE INVENTION

1. Field of the Invention

The present invention relates to a laminated optical film, and a liquid crystal panel and a liquid crystal display apparatus using the laminated optical film. More specifically, the present invention relates to a laminated optical film having a polarizer and two optical compensation layers, and a liquid crystal panel and a liquid crystal display apparatus using the laminated optical film.

2. Description of Related Art

Various optical films each having a polarizing film and an optical compensation layer in combination are generally used in an image display apparatus (such as a liquid crystal display apparatus) so that optical compensation is performed.

In general, a circularly polarizing plate which is one type of the above-mentioned optical films can be produced by combining a polarizing film and a $\lambda/4$ plate. However, the $\lambda/4$ plate has characteristics providing larger retardation values with shorter wavelengths, so-called "positive wavelength dispersion characteristics", and the $\lambda/4$ plate generally has high positive wavelength dispersion characteristics. Thus, the $\lambda/4$ plate has a problem in that the plate cannot exhibit desired optical characteristics (such as functions as the $\lambda/4$ plate) over a wide wavelength range. In order to avoid the problem, there has been, in recent years, proposed a retardation plate having wavelength dispersion characteristics providing larger retardation values with longer wavelengths, so-called "reverse dispersion characteristics", such as a modified-cellulose-based film and a modified-polycarbonate-based film. However, those films have a problem with cost.

At present, the following method is employed: a $\lambda/4$ plate having positive wavelength dispersion characteristics is combined with a retardation plate providing larger retardation values with longer wavelengths or a $\lambda/2$ plate, to thereby correct the wavelength dispersion characteristics of the $\lambda/4$ plate (see Japanese Patent No. 3174367, for example). However, according to those technologies, the enhancement of a screen contrast and the reduction in a color shift are insufficient.

SUMMARY OF THE INVENTION

The present invention has been made in view of solving the above conventional problems, and an object of the present invention is to provide a laminated optical film, a liquid crystal panel, and a liquid crystal display apparatus that are excellent in a screen contrast and have a small color shift.

According to one aspect of the invention, a laminated optical film is provided. The laminated optical film includes a polarizer; a first optical compensation layer which has a refractive index ellipsoid showing a relationship of $nx>ny>nz$; and a second optical compensation layer which has a refractive index ellipsoid showing a relationship of $nz>nx>ny$, wherein the polarizer and the first optical compensation layer are placed so that an absorption axis of the polarizer is parallel to or perpendicular to a slow axis of the first optical compensation layer, and the polarizer and the second optical compensation layer are placed so that an absorption axis of the polarizer is parallel to or perpendicular to a slow axis of the second optical compensation layer.

In one embodiment of the invention, an Nz coefficient of the second optical compensation layer is −1.0 or less.

In another embodiment of the invention, an in-plane retardation $Re_2$ of the second optical compensation layer satisfies a relationship of $0\ nm < Re_2 \leq 70\ nm$.

In still another embodiment of the invention, the laminated optical film further includes a third optical compensation layer which has a refractive index ellipsoid showing a relationship of one of $nx>ny=nz$ and $nx>ny>nz$.

In still another embodiment of the invention, an in-plane retardation $Re_3$ of the third optical compensation layer is 80 to 200 nm.

In still another embodiment of the invention, the laminated optical film further includes a fourth optical compensation layer which has a refractive index ellipsoid showing a relationship of $nx=ny>nz$.

According to another aspect of the invention, a liquid crystal panel is provided. The liquid crystal panel includes a liquid crystal cell and the laminated optical film.

In one embodiment of the invention, the liquid crystal cell is in a VA mode.

According to still another aspect of the invention, a liquid crystal display apparatus is provided. The liquid crystal display apparatus includes the liquid crystal panel.

According to the present invention, a screen contrast can be enhanced and a color shift can be reduced by placing a first optical compensation layer and a second optical compensation layer both having the above optical characteristics at a predetermined angle.

BRIEF DESCRIPTION OF THE DRAWINGS

FIG. 3 is a schematic cross-sectional view illustrating an alignment state of liquid crystal molecules in a liquid crystal layer in the case where a liquid crystal cell in a VA mode is adopted in a liquid crystal display apparatus of the present invention.

FIG. 4 shows the results of a computer simulation regarding viewing angle dependence of a contrast of a liquid crystal panel in Example 1 of the present invention.

DETAILED DESCRIPTION OF THE INVENTION

Hereinafter, although the present invention will be described byway of a preferred embodiment, the present invention is not limited thereto.

Definitions of Terms and Symbols

The definitions of terms and symbols used in the present specification are as follows.

(1) Refractive Index (nx, ny, nz)

"nx" denotes a refractive index in a direction (i.e., a slow axis direction) in which a refractive index in a plane is maximum, "ny" denotes a refractive index in a direction (i.e., a fast axis direction) perpendicular to a slow axis in the plane, and "nz" denotes a refractive index in a thickness direction.

(2) In-Plane Retardation (Re)

An in-plane retardation (Re) refers to an in-plane retardation of a layer (film) at a wavelength of 590 nm at 23° C. unless otherwise specified. Re is obtained by Re=(nx−ny)×d, when d (nm) is a thickness of a layer (film). In this specification, Re(550) refers to an in-plane retardation of a layer (film), at a wavelength of 550 nm. Further, the subscript "1" attached to a term or symbol described in this specification represents a first optical compensation layer, and the subscript "2" represents a second optical compensation layer. For example, an in-plane retardation of the first optical compensation layer is represented by $Re_1$.

(3) Thickness Direction Retardation (Rth)

A thickness direction retardation (Rth) refers to a retardation in a thickness direction of a layer (film) at a wavelength of 590 nm at 23° C. unless otherwise specified. Rth is obtained by Rth=(nx−nz)×d, when d (nm) is a thickness of a layer (film). In this specification, Rth(550) refers to a thickness direction retardation of a layer (film) at a wavelength of 550 nm. Further, for example, a thickness direction retardation of the first optical compensation layer is represented by $Rth_1$ in this specification.

(4) Nz Coefficient

An Nz coefficient is obtained by Nz=Rth/Re.

(5) λ/4 Plate

"λ/4 plate" refers to an electrooptic birefringent plate, which has a function of causing an optical path difference of a ¼ wavelength between linear polarized light beams that vibrate in directions perpendicular to each other.

A. Laminated Optical Film

A-1. Whole Configuration of Laminated Optical Film

Figure 1A:
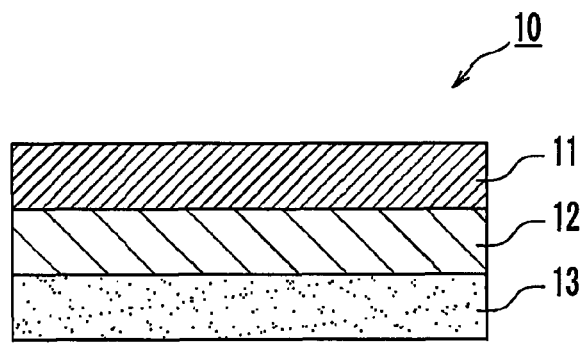
FIG. 1A is a schematic cross-sectional view of a laminated optical film according to a preferred embodiment of the present invention.
Figure 1B:
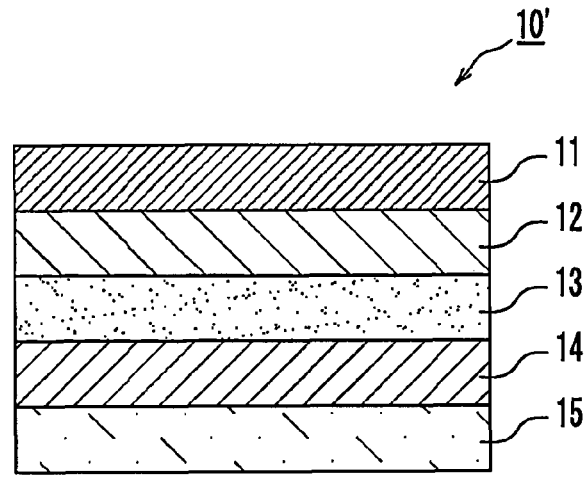
FIG. 1B is a schematic cross-sectional view of a laminated optical film according to another preferred embodiment of the present invention.

FIG. 1A is a schematic cross-sectional view of a laminated optical film according to a preferred embodiment of the present invention. A laminated optical film 10 includes a polarizer 11, a first optical compensation layer 12, and a second optical compensation layer 13. The first optical compensation layer 12 and the second optical compensation layer 13 are placed on one side of the polarizer 11. FIG. 1B is a schematic cross-sectional view of a laminated optical film according to another preferred embodiment of the present invention. A laminated optical film 10' includes a polarizer 11, and a first optical compensation layer 12, a second optical compensation layer 13, a third optical compensation layer 14, and a fourth optical compensation layer 15 placed on one side of the polarizer 11. The lamination order of each optical compensation layer is not particularly limited, and any suitable order can be adopted. Preferably, as in an illustrated example, the polarizer, the first optical compensation layer, the second optical compensation layer, the third optical compensation layer, and the fourth optical compensation layer are laminated in the stated order.

Although not shown in FIGS. 1A and 1B, if required, the laminated optical film of the present invention includes a first protective layer between the polarizer 11 and the optical compensation layer, and a second protective layer on a side of the polarizer 11 where the optical compensation layer is not placed. In the case where the first protective layer is not provided, the first optical compensation layer 12 can also function as the protective layer of the polarizer 11. The first optical compensation layer functions as a protective layer, thereby contributing to the reduction in thickness of the laminated optical film (liquid crystal panel). Further, the laminated optical film of the present invention further includes any suitable optical compensation layer, if required.

The first optical compensation layer 12 has a refractive index ellipsoid of nx>ny>nz. The first optical compensation layer 12 is placed so that a slow axis thereof forms any suitable angle with respect to an absorption axis of the polarizer 11, depending upon the purpose, the configuration of a liquid crystal panel to which the first optical compensation layer 12 is applied, and the like. Preferably, the polarizer 11 and the first optical compensation layer 12 are placed so that the absorption axis and the slow axis thereof are parallel to or perpendicular to each other. More preferably, the polarizer and the first optical compensation layer are placed so that the absorption axis and the slow axis thereof are perpendicular to each other. The polarizer 11 and the first optical compensation layer 12 are placed with such a positional relationship, whereby a liquid crystal panel with a screen contrast enhanced and a color shift reduced is obtained. As used herein, the term "parallel" also includes the case of being substantially parallel. Here, the phrase "substantially parallel" includes a case at 0°±3.0°, preferably 0°±1.0°, and more preferably 0°±0.5°. It should be noted that the term "perpendicular" herein includes substantially perpendicular. Here, the phrase "substantially perpendicular" includes a case at 90°±3.0°, preferably 90°±1.0°, and more preferably 90°±0.5°.

The second optical compensation layer 13 has a refractive index ellipsoid of nz>nx>ny. The second optical compensation layer 13 is placed so that a slow axis thereof forms any suitable angle with respect to an absorption axis of the polarizer 11, depending upon the purpose, the configuration of a liquid crystal panel, and the like. Preferably, the polarizer 11 and the second optical compensation layer 13 are placed so that the absorption axis and the slow axis thereof are parallel to or perpendicular to each other. More preferably, the polarizer and the second optical compensation layer are placed so that the absorption axis and the slow axis thereof are perpendicular to each other. The polarizer 11 and the second optical compensation layer 13 are placed with such a positional relationship, whereby a liquid crystal panel with a screen contrast enhanced and a color shift reduced is obtained.

The third optical compensation layer 14 has a refractive index ellipsoid of nx>ny=nz or nx>ny>nz. The third optical compensation layer 14 is placed so that a slow axis thereof forms any suitable angle with respect to an absorption axis of the polarizer 11, depending upon the purpose, the configuration of a liquid crystal panel, and the like. Specifically, the third optical compensation layer 14 is placed so that the slow axis thereof forms an angle of preferably 30° to 60°, more preferably 35° to 55°, still more preferably 40° to 50°, particularly preferably 43° to 47°, and most preferably about 45° with respect to the absorption axis of the polarizer 11. The polarizer 11 and the third optical compensation layer 14 are placed with such a positional relationship, whereby a liquid crystal panel with a screen contrast enhanced and a color shift reduced is obtained.

The total thickness of the laminated optical film of the present invention is preferably 100 to 400 μm, still more preferably 150 to 300 μm, and particularly preferably 180 to 250 μm. Hereinafter, each layer constituting the laminated optical film of the present invention will be described in detail.

A-2. First Optical Compensation Layer

The first optical compensation layer has a refractive index ellipsoid with a relationship of nx>ny>nz. The in-plane retardation $Re_1$ of the first optical compensation layer is preferably 80 to 200 nm, more preferably 80 to 150 nm, and still more preferably 80 to 130 nm. The Nz coefficient ($Rth_1/Re_1$) has a relationship of preferably 1<Nz<2 and more preferably 1<Nz<1.5. By providing the first optical compensation layer having such optical characteristics, the absorption axis of the polarizer can be preferably compensated for and the screen contrast of the liquid crystal panel can be enhanced. Further, the color shift can be reduced.

The first optical compensation layer can be formed of any appropriate material. Specifically, a stretched film of a polymer film is a specific example of the material. A resin of which the polymer film is formed is preferably a norbornene-based resin or a polycarbonate-based resin.

The above norbornene-based resin is obtained by polymerizing a norbornene-based monomer as a polymerization unit. Examples of the norbornene-based monomer include: norbornene, and its alkyl and/or alkylidene-substituted monomers such as 5-methyl-2-norbornene, 5-dimethyl-2-norbornene, 5-ethyl-2-norbornene, 5-butyl-2-norbornene, 5-ethylidene-2-norbornene, and substituted monomers of norbornene and its alkyl and/or alkylidene-substituted monomers with a polar group such as halogen; dicyclopentadiene, 2,3-dihydrodicyclopentadiene, or the like; dimethanooctahydronaphthalene, its substituted monomers with alkyl and/or alkylidene, and its substituted monomers with a polar group such as halogen, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethyliden-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and a trimer or tetramer of cyclopentadiene such as 4,9:5,8-dimethano-3a,4,4a,5,8,8a,9,9a-octahydro-1H-benzoindene, or 4,11:5,10:6,9-trimethano-3a,4,4a,5,5a,6,9,9a,10,10a,11,11a-dodecahydro-1H-cyclopentaanthracene. The above norbornene-based resin may be a copolymer of a norbornene-based monomer and another monomer.

As the above polycarbonate-based resin, an aromatic polycarbonate is preferably used. The aromatic polycarbonate can be typically obtained by the reaction between a carbonate precursor and an aromatic dihydric phenol compound. Specific examples of the carbonate precursor include phosgene, bischloroformate of dihydric phenols, diphenyl carbonate, di-p-tolylcarbonate, phenyl-p-tolylcarbonate, di-p-chlrophenylcarbonate, and dinaphthylcarbonate. Of those, phosgene and diphenylcarbonate are preferred. Specific examples of the aromatic dihydric phenol compound include: 2,2-bis(4-hydroxyphenyl)propane; 2,2-bis(4-hydroxy-3,5-dimethylphenyl)propane; bis(4-hydroxyphenyl)methane; 1,1-bis(4-hydroxyphenyl)ethane; 2,2-bis(4-hydroxyphenyl)butane; 2,2-bis(4-hydroxy-3,5-dimethylphenyl)butane; 2,2-bis(4-hydroxy-3,5-dipropylphenyl)propane; 1,1-bis(4-hydroxyphenyl)cyclohexane; and 1,1-bis(4-hydroxyphenyl)-3,3,5-trimethylcyclohexane. They may be used alone or in combination. Preferred are: 2,2-bis(4-hydroxyphenyl)propane; 1,1-bis(4-hydroxyphenyl)cyclohexane; and 1,1-bis(4-hydroxyphenyl)-3,3,5-trimethylcyclohexane. In particular, 2,2-bis(4-hydroxyphenyl)propane and 1,1-bis(4-hydroxyphenyl)-3,3,5-trimethylcyclohexane are preferably used in combination.

The polymer film may contain any other appropriate thermoplastic resin. Examples of the other thermoplastic resins include general-purpose plastics such as a polyolefin resin, a polyvinyl chloride-based resin, a cellulose-based resin, a styrene-based resin, an acrylonitrile/butadiene/styrene-based resin, an acrylonitrile/styrene-based resin, polymethyl methacrylate, polyvinyl acetate, and a polyvinylidene chloride-based resin; general-purpose engineering plastics such as a polyamide-based resin, a polyacetal-based resin, a polycarbonate-based resin, a denatured polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline resin, a polyamide-imide-based resin, a polyimide-based resin, and a polytetrafluoroethylene-based resin.

As a method of producing a stretched film, any suitable method can be adopted. Examples of a stretching method include transverse uniaxial stretching method, free-end uniaxial stretching, fixed-end biaxial stretching, fixed-end uniaxial stretching, and sequential biaxial stretching. Specific examples of the fixed-end biaxial stretching include a method of stretching a polymer film in a short direction (transverse direction) while allowing the polymer film to run in a longitudinal direction. This method can be apparently transverse uniaxial stretching method. These stretching methods can be adopted alone or in combination of at least two methods. For example, fixed-end uniaxial stretching is performed after free-end uniaxial stretching is performed. The stretching temperature is preferably 135 to 165° C. and more preferably 140 to 160° C. The stretching ratio is preferably 1.2 to 3.2 times and more preferably 1.3 to 3.1 times. In this case, the thickness is typically 20 to 80 μm, preferably 25 to 75 μm, and more preferably 30 to 60 μm.

Another specific example forming the first optical compensation layer includes a non-liquid crystalline material. The non-liquid crystalline material is preferably a non-liquid crystalline polymer. Specifically, polymers such as polyamide, polyimide, polyester, polyetherketone, polyamideimide, polyesterimide are preferred. These polymers may be used alone or as a mixture of at least two kinds. Of those, polyimide is particularly preferred due to high transparency, high alignment property, and high stretchability.

The first optical compensation layer can be formed typically by applying a solution of the non-liquid crystalline polymer to a base film and removing a solvent. In the method of forming the optical compensation layer, preferably a treatment for giving optical biaxiality (nx>ny>nz) (e.g., a stretching treatment) is performed. Such a treatment can provide a refractive index difference (nx>ny) in a plane surely. Specific examples of the polyimide and specific examples of the method of forming the optical compensation layer include the polymers and the method of producing an optical compensation film described in Japanese Patent Application Laid-open No. 2004-46065. In this case, the thickness of the first optical compensation layer is typically 0.1 to 10 μm, preferably 0.1 to 8 μm, and still more preferably 0.1 to 5 μm.

A-3. Second Optical Compensation Layer

The second optical compensation layer has a refractive index ellipsoid showing a relationship of nz>nx>ny. A layer (film) with such a refractive index ellipsoid may be referred to as a "positive biaxial plate", etc.

The in-plane retardation $Re_2$ of the second optical compensation layer satisfies a relationship of preferably 0 nm<$Re_2$≤70 nm, more preferably 0 nm<$Re_2$≤60 nm, still more preferably 0 nm<$Re_2$≤50 nm, and particularly preferably 10 nm<$Re_2$<50 nm. The thickness direction retardation $Rth_2$ of the second optical compensation layer is preferably −200 to −50 nm, more preferably −100 to −50 nm, and particularly preferably −80 to −60 nm. The Nz coefficient ($Rth_2$/$Re_2$) of the second optical compensation layer is preferably −1.0 or less, more preferably −10 to −1.0, and particularly preferably −8.0 to −1.6. By providing the second optical compensation layer having such optical characteristics, an absorption axis of the polarizer can be compensated for in a preferred manner, and a screen contrast of a liquid crystal panel can be enhanced. Further, a color shift can be reduced.

The second optical compensation layer can have any suitable configuration. Specifically, the second optical compensation layer may be formed of a retardation film alone, or may be a laminate of at least two identical or different retardation films. In the case where the second optical compensation layer is a laminate, the second optical compensation layer can include a pressure-sensitive adhesive layer or an adhesive layer for attaching at least two retardation films. The second optical compensation layer is preferably a single retardation film. By adopting such a configuration, the variation and unevenness of a retardation value caused by the shrinkage stress of the polarizer and the heat of the light source can be reduced. Further, such a configuration can contribute to the reduction in thickness of a liquid crystal panel to be obtained.

The optical characteristics of the retardation film can be set to be any suitable value depending upon the configuration of the second optical compensation layer. For example, in the case where the second optical compensation layer is a single retardation film, it is preferred that the optical characteristics of the retardation film be set to be equal to those of the second optical compensation layer. Thus, the retardation values of the pressure-sensitive adhesive layer, the adhesive layer, and the like used for laminating the retardation film on the polarizer, other optical compensation layers, and the like are preferably as small as possible.

The total thickness of the second optical compensation layer is preferably 10 to 500 μm, more preferably 20 to 400 μm, and particularly preferably 30 to 300 μm. When the thickness of the second optical compensation layer is in such ranges, the handling property during production becomes excellent, and the optical uniformity of a liquid crystal display apparatus (liquid crystal panel) to be obtained can be enhanced.

As the retardation film, a film, which is excellent in transparency, mechanical strength, thermal stability, water repellency, and the like, and which is unlikely to cause optical unevenness due to distortion, is preferably used. As the retardation film, a stretched polymer film mainly containing a thermoplastic resin is used preferably. As the thermoplastic resin, a polymer that exhibits negative birefringence is used preferably. By using a polymer exhibiting negative birefringence, a retardation film having a refractive index ellipsoid of nz>nx>ny can be obtained easily. Herein, the expression "exhibiting negative birefringence" means that, when a polymer is aligned by stretching or the like, the refractive index in the stretching direction decreases relatively; in other words, the refractive index in a direction perpendicular to the stretching direction increases. An example of the polymer exhibiting negative birefringence includes a polymer in which a chemical bond or a functional group having large polarization anisotropy, such as an aromatic ring and a carbonyl group, is introduced into a side chain. Specifically, examples of such a polymer include an acrylic resin, a styrene-based resin, and a maleimide-based resin.

The acrylic resin can be obtained by, for example, subjecting acrylate-based monomers to addition polymerization. Examples of the acrylic resin include polymethyl methacrylate (PMMA), polybutyl methacrylate, and polycyclohexyl methacrylate.

The styrene-based resin can be obtained by, for example, subjecting styrene-based monomers to addition polymerization. Examples of the styrene-based monomer include styrene, α-methyl styrene, o-methyl styrene, p-methyl styrene, p-chlorostyrene, p-nitrostyrene, p-aminostyrene, p-carboxystyrene, p-phenyl styrene, 2,5-dichlorostyrene, and p-t-butyl styrene.

The maleimide-based resin can be obtained by, for example, subjecting maleimide-based monomers to addition polymerization. Examples of the maleimide-based monomer include N-ethyl maleimide, N-cyclohexyl maleimide, N-phenyl maleimide, N-(2-methylphenyl)maleimide, N-(2-ethylphenyl)maleimide, N-(2-propylphenyl)maleimide, N-(2-isopropylphenyl)maleimide, N-(2,6-dimethylphenyl)maleimide, N-(2,6-dipropylphenyl)maleimide, N-(2,6-diisopropylphenyl)maleimide, N-(2-methyl-6-ethylphenyl)maleimide, N-(2-chlorophenyl)maleimide, N-(2,6-dichlorophenyl)maleimide, N-(2-bromophenyl)maleimide, N-(2,6-dibromophenyl)maleimide, N-(2-biphenyl)maleimide, and N-(2-cyanophenyl)maleimide. The maleimide-based monomer is available from Tokyo Chemical Industry Co., Ltd. and the like.

In the addition polymerization, the birefringence characteristics of the resin to be obtained can also be controlled by subjecting the side chain to substitution, maleimidization, or a grafting reaction after the polymerization.

The polymer exhibiting negative birefringence may be a polymer copolymerized with another monomer. The brittleness, forming processability, and heat resistance can be improved owing to the copolymerization with another monomer. Examples of the another monomer include: olefins such as ethylene, propylene, 1-butene, 1,3-butadiene, 2-methyl-1-butene, 2-methyl-1-pentene, and 1-hexene; acrylonitrile; (meth)acrylates such as methyl acrylate and methyl methacrylate; maleic anhydride; and vinyl esters such as vinyl acetate.

In the case where the polymer exhibiting negative birefringence is a copolymer of the styrene-based monomer and the another monomer, the compounding ratio of the styrene-based monomer is preferably 50 to 80 mol %. In the case where the polymer exhibiting negative birefringence is a copolymer of the maleimide-based monomer and the another monomer, the compounding ratio of the maleimide-based monomer is preferably 2 to 50 mol %. By compounding the monomers in such ranges, a polymer film excellent in tenacity and forming processability can be obtained.

As the polymer exhibiting negative birefringence, preferably, a styrene-maleic anhydride copolymer, a styrene-acrylonitrile copolymer, a styrene-(meth)acrylate copolymer, a styrene-maleimide copolymer, a vinyl ester-maleimide copolymer, an olefin-maleimide copolymer, or the like are used. These polymers can be used alone or in combination. These polymers exhibit high negative birefringence and can be excellent in heat resistance. These polymers are available from, for example, Nova Chemicals Japan Ltd., Arakawa Chemical Industries, Ltd., or the like.

As the polymer exhibiting negative birefringence, preferably, a polymer having a repeating unit represented by the following General Formula (I) is also used. Such a polymer exhibits higher negative birefringence and can be excellent in heat resistance and mechanical strength. Such a polymer can be obtained by, for example, using an N-phenyl substituted maleimide in which a phenyl group having a substituent at least at its ortho-positions is introduced as an N-substituent of a maleimide-based monomer of a starting material.

Chemical Formula 1

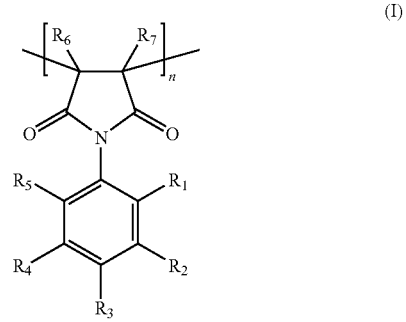

(I)

In the General Formula (I), $R_1$ to $R_5$ each independently represent a hydrogen atom, a halogen atom, carboxylic acid, an carboxylic acid ester, a hydroxyl group, a nitro group, or a straight or branched alkyl group or alkoxy group each having 1 to 8 carbon atoms (provided that $R_1$ and $R_5$ are not hydrogen atoms at the same time); $R_6$ and $R_7$ represent a hydrogen atom or a straight or branched alkyl group or alkoxy group each having 1 to 8 carbon atoms; and n represents an integer of 2 or more.

The polymer exhibiting negative birefringence is not limited to the above, and for example, a cyclic olefin-based copolymer as disclosed in Japanese Patent Application Laid-open No. 2005-350544 or the like can also be used. Further, a composition containing a polymer and an inorganic fine particle as disclosed in Japanese Patent Application Laid-open No. 2005-156862, Japanese Patent Application Laid-open No. 2005-227427, and the like can also be used preferably. As the polymer exhibiting negative birefringence, one kind may be used alone, or at least two kinds may be mixed before use. Further, these polymers can be denatured by copolymerization, branching, cross-linking, molecular terminal modification (or sealing), stereoregulation alteration, or the like before use.

The polymer film may further contain any appropriate additive as required. Specific examples of the additive include a plasticizer, a thermal stabilizer, a light stabilizer, a lubricant, an antioxidant, a UV absorber, a flame retardant, a colorant, an antistatic agent, a compatibilizing agent, a cross-linking agent, and a thickener. The kind and content of the additive to be used may be appropriately set depending on the purpose. The content of the additive is approximately 3 to 10 parts by weight with respect to 100 parts by weight of a total solid content of the polymer film. When the content of the additive is excessively large, the transparency of the polymer film may be degraded, or the additive may exude from the polymer film surface.

Any appropriate forming method may be employed as a method of forming the polymer film. Examples of the appropriate forming method include compression molding, transfer molding, injection molding, extrusion molding, blow molding, powder molding, FRP molding, solvent casting, and the like. Of those, extrusion molding or solvent casting is preferred because a highly smooth retardation film with favorable optical uniformity can be obtained. To be specific, the extrusion molding involves: melting the resin composition containing a thermoplastic resin, a plasticizer, an additive, and the like under heating; extruding the molten resin composition into a thin film on a surface of a casting roller by using a T-die or the like; and cooling the whole to form a film. The solvent casting involves: defoaming a dense solution (dope) prepared by dissolving in a solvent the resin composition; uniformly casting the defoamed solution into a thin film on a surface of a metallic endless belt or a rotating drum, a plastic substrate, or the like; and evaporating the solvent to form a film. It should be noted that forming conditions may be appropriately set in accordance with the composition or kind of the resin to be used, the forming method, and the like.

The retardation film (stretched film) can be obtained by stretching the polymer film under any suitable stretching conditions. Specific examples of the stretching method include a longitudinal uniaxial stretching method, a transverse uniaxial stretching method, a longitudinal and transverse sequential biaxial stretching method, and a longitudinal and transverse simultaneous biaxial stretching method. Preferably, the transverse uniaxial stretching method, longitudinal and transverse sequential biaxial stretching method, and longitudinal and transverse simultaneous biaxial stretching method are used. This is because a biaxial retardation film can be obtained in a preferred manner. In the polymer exhibiting negative birefringence, the refractive index in a stretching direction decreases relatively as described above. Therefore, in the case of the transverse uniaxial stretching method, a slow axis is provided in a transport direction of the polymer film (the refractive index in a transport direction becomes nx). In the case of the longitudinal and transverse sequential biaxial stretching method and longitudinal and transverse simultaneous biaxial stretching method, any of the transport direction and the width direction can be set to be a slow axis depending upon the ratio of a longitudinal and transverse stretching ratio. Specifically, when the stretching ratio in the longitudinal (transport) direction is increased relatively, the transverse (width) direction becomes a slow axis, and when the stretching ratio in the transverse (width) direction is increased relatively, the longitudinal (transport) direction becomes a slow axis.

As a stretching apparatus used for the above stretching, any suitable stretching apparatus can be used. Specific examples thereof include a roll stretching machine, a tenter stretching machine, and a pantograph type or linear motor type biaxial stretching machine. In heat stretching, a stretching temperature may be continuously changed or may be changed in steps. The stretching may be performed in two or more steps.

The stretching temperature (temperature in a stretching oven when a polymer film is stretched) is preferably in the vicinity of a glass transition temperature (Tg) of a polymer film. Specifically, the stretching temperature is preferably (Tg−10)° C. to (Tg+30)° C., more preferably Tg to (Tg+25)° C., and particularly preferably (Tg+5)° C. to (Tg+20)° C. When the stretching temperature is too low, the retardation value and the direction of a slow axis may become non-uniform, and the polymer film may be crystallized (become whitish). On the other hand, when the stretching temperature is excessively high, the polymer film may be molten and the expression of the retardation may become insufficient. The stretching temperature is typically 110 to 200° C. The glass transition temperature can be obtained by a DSC method in accordance with JISK7121-1987.

As a method of controlling the temperature in the stretching oven, any suitable method can be adopted. Examples thereof include methods using an air circulation type temperature-controlled oven in which hot air or cold air circulates, a heater using a micro-wave, an far-infrared ray, or the like, a roll heated for regulating temperature, a heat pipe roll, a metal belt, or the like.

The stretching ratio for stretching a polymer film can be set to be any suitable value depending upon the composition of the polymer film, the kinds of a volatile component and the like, the remaining amounts of a volatile component and the like, a desired retardation value, and the like. The stretching ratio is preferably 1.05 to 5.00 times. Further, the feed speed during stretching is preferably 0.5 to 20 m/min. in terms of mechanical precision, stability, and the like of the stretching apparatus.

Thus, the method of obtaining a retardation film using the polymer exhibiting negative birefringence has been described. The retardation film can also be obtained by using a polymer exhibiting positive birefringence. As the method of obtaining a retardation film using a polymer exhibiting positive birefringence, for example, a stretching method of increasing a refractive index in a thickness direction as disclosed in Japanese Patent Application Laid-open No. 2000-231016, Japanese Patent Application Laid-open No. 2000-206328, Japanese Patent Application Laid-open No. 2002-207123, and the like can be used. A specific example includes a method of attaching a heat shrinkable film to one surface or both surfaces of a film containing a polymer exhibiting positive refractive index, followed by heat treatment. The film is shrunk in a length direction and a width direction under the action of a shrinking force of the heat shrinkable film caused by heat treatment, whereby the refractive index in a thickness direction can be increased, and a retardation film having a refractive index ellipsoid of nz>nx>ny can be obtained.

As described above, the positive biaxial plate used in the second optical compensation layer can be produced by using a polymer exhibiting positive or negative birefringence. In general, the use of a polymer exhibiting positive birefringence has an advantage in that there are many kinds of polymers that can be selected. The use of a polymer exhibiting negative birefringence has an advantage in that a retardation film excellent in uniformity in a slow axis direction is obtained more easily due to its stretching method, compared with the case of using a polymer exhibiting positive birefringence.

As the retardation film used in the second optical compensation layer, commercially available optical films can be used as they are instead of the above-mentioned films. Further, the commercially available optical films can also be used after being subjected to secondary treatment such as stretching and/or relaxation.

The light transmittance of the retardation film at a wavelength of 590 nm is preferably 80% or more, more preferably 85% or more, and particularly preferably 90% or more. The theoretical upper limit of a light transmittance is 100%; however, the upper limit of a light transmittance that can be realized is about 94% because surface reflection is caused by the refractive index difference between air and the retardation film. A similar light transmittance is preferred in the second optical compensation layer as a whole.

The absolute value of a photoelastic coefficient of the retardation film is preferably $1.0\times10^{-10}$ $(m^2/N)$ or less, more preferably $5.0\times10^{-11}$ $(m^2/N)$ or less, more preferably $3.0\times10^{-11}$ $(m^2/N)$ or less, and particularly preferably $1.0\times10^{-11}$ $(m^2/N)$ or less. By setting the photoelastic coefficient in such range, there can be obtained a liquid crystal display apparatus (liquid crystal panel), which is excellent in optical uniformity and durability, and in which optical characteristics change less even in an environment at high temperature and high humidity, etc. Although the lower limit value of the photoelastic coefficient is not particularly limited, the lower limit value is generally $5.0\times10^{-13}$ $(m^2/N)$ or more, and preferably $1.0\times10^{-12}$ $(m^2/N)$ or more. When the photoelastic coefficient is excessively small, the expression property of a retardation may become small. The photoelastic coefficient is a value inherent in the chemical structure of a polymer and the like; however, the photoelastic coefficient can be reduced by copolymerizing or mixing a plurality of components having photoelastic coefficients with different signs (positive/negative).

The thickness of the retardation film can be set to be any suitable value depending upon the material forming the retardation film and the configuration of the second optical compensation layer. In the case where the second optical compensation layer is formed of a single retardation film, the thickness of the second optical compensation layer is preferably 10 to 250 μm, more preferably 20 to 200 μm, and particularly preferably 30 to 150 μm. Due to such a thickness, a second optical compensation layer excellent in mechanical strength and display uniformity can be obtained.

A-4. Third Optical Compensation Layer

The laminated optical film of the present invention can further include a third optical compensation layer, as described above. The third optical compensation layer can function as a so-called λ/4 plate. The third optical compensation layer can convert, for example, linearly polarized light with a particular wavelength into circularly polarized light (or circularly polarized light into linearly polarized light) as a λ/4 plate. The third optical compensation layer can mainly compensate for the liquid crystal cell. The in-plane retardation $Re_3$ of the third optical compensation layer is preferably 80 to 200 nm, more preferably 90 to 160 nm, still more preferably 110 to 155 nm, and particularly preferably 130 to 150 nm.

A-4-1. Third Optical Compensation Layer (1)

In one embodiment, the third optical compensation layer has a refractive index ellipsoid of nx>ny=nz. Herein, "ny=nz" includes not only the case where ny and nz are strictly equal to each other but also the case where ny and nz are substantially equal to each other. More specifically, "ny=nz" refers to the case where an Nz coefficient ($Rth_3/Re_3$) is more than 0.9 and less than 1.1.

As a material forming the third optical compensation layer having a refractive index ellipsoid of nx>ny=nz, any suitable material can be adopted as long as the above properties can be obtained. A liquid crystal material is preferred, and a liquid crystal material (nematic liquid crystal) having a liquid crystal phase of a nematic phase is more preferred. By using the liquid crystal material, the difference between nx and ny of an optical compensation layer to be obtained can be increased remarkably compared with that of a non-liquid crystal material. Consequently, the thickness of an optical compensation layer for obtaining a desired in-plane retardation can be decreased remarkably, which can contribute to the reduction in thickness of a laminated optical film and a liquid crystal panel to be obtained. As such a liquid crystal material, for example, a liquid crystal polymer and a liquid crystal monomer can be used. The expression mechanism of liquid crystallinity of the liquid crystal material may be a lyotropic type or a thermotropic type. The alignment state of liquid crystal is preferably homogeneous alignment. The liquid crystal polymer and the liquid crystal monomer may be respectively used alone or in combination.

In the case where the liquid crystal material is a liquid crystalline monomer, it is preferred that the liquid crystalline monomer is, for example, a polymerizable monomer and/or cross-linkable monomer. This is because the alignment state of the liquid crystalline monomer can be fixed by polymerizing or cross-linking the liquid crystalline monomer. When the liquid crystalline monomers are aligned and then, for example, polymerized or cross-linked with each other, the above alignment state can be fixed. A polymer is formed by the polymerization and a three-dimensional network structure is formed by the cross-linking, both of which are non-liquid crystalline. Thus, in the formed third optical compensation layer, for example, a phase transition between a liquid crystal phase, a glass phase, and a crystal phase due to a change in temperature inherent in a liquid crystalline compound is not occurred. As a result, the formed third optical compensation layer becomes an optical compensation layer remarkably excellent in stability, which is not influenced by a change in temperature.

Specific examples of the liquid crystal monomer and the method of forming a third optical compensation layer include the monomer and the forming method described in Japanese Patent Application Laid-open No. 2006-178389.

The thickness of the third optical compensation layer can be set so as to function as a λ/4 plate most suitably. In other words, the thickness can be set so as to obtain desired optical characteristics. In the case where the third optical compensation layer is formed of a liquid crystal material, the thickness is preferably 0.5 to 10 μm, more preferably 0.5 to 8 μm, and still more preferably 0.5 to 5 μm.

The third optical compensation layer having a refractive index ellipsoid of nx>ny=nz can also be formed by stretching a polymer film. Specifically, the third optical compensation layer having the desired optical characteristics (for example, a refractive index ellipsoid, an in-plane retardation, a thickness direction retardation) can be obtained by appropriately selecting the kind of a polymer, stretching conditions (for example, a stretching temperature, a stretching ratio, a stretching direction), a stretching method, and the like. More specifically, the stretching temperature is preferably 110 to 170° C. and more preferably 130 to 150° C. The stretching ratio is preferably 1.37 to 1.67 times and more preferably 1.42 to 1.62 times. An example of the stretching method includes transverse uniaxial stretching method.

In the case where the third optical compensation layer is formed by stretching a polymer film, the thickness is preferably 5 to 55 μm, more preferably 10 to 50 μm, and still more preferably 15 to 45 μm.

As a resin forming the polymer film, any suitable resin can be adopted. Specific examples thereof include resins constituting a positive birefringence film, such as a norbornene-based resin, a polycarbonate-based resin, a cellulose-based resin, a polyvinyl alcohol-based resin, a polysulphone-based resin. Of those, the norbornene-based resin and the polycarbonate-based resin are preferred. The details of these resins are as described above in Section A-2.

A-4-2. Third Optical Compensation Layer (2)

In another embodiment, the third optical compensation layer has a refractive index ellipsoid of nx>ny>nz. The Nz coefficient ($Rth_3/Re_3$) of the third optical compensation layer is 1.1 or more, and has a relationship of preferably 1.1<Nz<2.0, and more preferably 1.3<Nz<1.8.

As the material and method for forming the third optical compensation layer having a refractive index ellipsoid of nx>ny>nz, the same material and method as those for the first optical compensation layer can be adopted.

A-5. Fourth Optical Compensation Layer

The laminated optical film of the present invention can further include a fourth optical compensation layer, as described above. The fourth optical compensation layer has a refractive index ellipsoid exhibiting a relationship of nx=ny>nz. Herein, "nx=ny" includes not only the case where nx and ny are strictly equal to each other but also the case where nx and ny are substantially equal to each other. Specifically, "nx=ny" refers to the case where $Re_4$ is less than 10 nm. The thickness direction retardation $Rth_4$ of the fourth optical compensation layer can be set to be any suitable value depending upon the configuration of a liquid crystal panel to which the fourth optical compensation layer is applied. The detail thereof will be described later in Section B-5. The fourth optical compensation layer can mainly compensate for a liquid crystal cell.

The fourth optical compensation layer can be formed of any suitable material as long as the above properties can be obtained. A specific example of the fourth optical compensation layer includes a cholesteric alignment fixed layer. The term "cholesteric alignment fixed layer" refers to a layer in which constituent molecules of the layer construct a helical structure, a helical axis thereof is aligned substantially perpendicularly with respect to a plane direction, and an alignment state thereof is fixed. Thus, the "cholesteric alignment fixed layer" includes not only the case where a liquid crystal compound exhibits a cholesteric liquid crystal phase, but also the case where a non-liquid crystalline compound constructs a pseudo structure as in a cholesteric liquid crystal phase. For example, the "cholesteric alignment fixed layer" can be formed by allowing a liquid crystal material to be aligned in a cholesteric structure (helical structure) by providing the liquid crystal material with distortion, using a chiral agent in a state where the liquid crystal material exhibits a liquid crystal phase, and subjecting the liquid crystal material in the aligned state to polymerization or cross-linking treatment, thereby fixing the alignment (cholesteric structure) of the liquid crystal material.

A specific example of the cholesteric alignment fixed layer includes a cholesteric layer described in Japanese Patent Application Laid-open No. 2003-287623.

The thickness of the fourth optical compensation layer can be set to be any suitable value as long as the desired optical characteristics described below can be obtained. In the case where the fourth optical compensation layer is a cholesteric alignment fixed layer, the thickness of the fourth optical compensation layer is preferably 0.5 to 10 μm, more preferably 0.5 to 8 μm, and still more preferably 0.5 to 5 μm.

Another specific example of the material forming the fourth optical compensation layer includes a non-liquid crystalline material. A non-liquid crystalline polymer is particularly preferred. Unlike the liquid crystalline material, such a non-liquid crystalline material can form a film exhibiting optical uniaxiality of nx=ny>nz due to the properties thereof, irrespective of the alignment property of a substrate. As the non-liquid crystalline material, for example, polymers such as polyamide, polyimide, polyester, polyetherketone, polyamideimide, and polyesterimide are preferred because of excellent heat resistance, chemical resistance, and transparency, and superior rigidity. Any one kind of these polymers may be used alone, or may be used as a mixture of at least two kinds having different functional groups, such as a mixture of polyaryl ether ketone and polyamide. Of those polymers, polyimide is particularly preferred because of high transparency, high alignment property, and high stretchability.

As a specific example of the polyimide and a specific example of a method of forming the fourth optical compensation layer, there are the polymers and the method of producing an optical compensation film described in Japanese Patent Application Laid-open No. 2004-46065.

The thickness of the fourth optical compensation layer can be set to be any suitable value as long as the desired optical characteristics described below can be obtained. In the case where the fourth optical compensation layer is formed of a non-liquid crystalline material, the thickness of the fourth optical compensation layer is preferably 0.5 to 10 μm, more preferably 0.5 to 8 μm, and still more preferably 0.5 to 5 μm.

Other specific examples of the material forming the fourth optical compensation layer include polymer films formed of a cellulose-based resin such as triacetylcellulose (TAC), norbornene-based resin, and the like. As the fourth optical compensation layer, a commercially available film can be used as it is. Further, a commercially available film can be subjected to a secondary treatment such as a stretching and/or shrinkage treatment before use. Examples of the commercially available film include Fujitac series (ZRF80S, TD80UF, TDY-80UL (trade name)) manufactured by Fuji Photo Film Co., Ltd., "KC8UX2M" (trade name) manufactured by Konica Minolta Opt Product, "Zeonor" (trade name) manufactured by Zeon Corporation, and "Arton" (trade name) manufactured by JSR Corporation. Norbornene-based monomers constituting a norbornene-based resin are as described above in Section A-2. As a stretching method capable of satisfying the optical characteristics, there is, for example, give biaxial stretching (longitudinal and transverse equal magnification stretching).

The thickness of the fourth optical compensation layer can be set to be any suitable value as long as the desired optical characteristics described below can be obtained. In the case where the fourth optical compensation layer is a polymer film formed of a cellulose-based resin, a norbornene-based resin, or the like, the thickness of the fourth optical compensation layer is preferably 45 to 105 μm, more preferably 55 to 95 μm, and still more preferably 50 to 90 μm.

Still another specific example of the fourth optical compensation layer includes a laminate having the cholesteric alignment fixed layer and a plastic film layer. Examples of a resin forming the plastic film layer include a cellulose-based resin and a norbornene-based resin. These resins are as described above in this section.

As a method of laminating the cholesteric alignment fixed layer and the plastic film layer, any suitable method can be adopted. Specifically, there are a method of transferring the cholesteric alignment fixed layer onto the plastic layer, a method of attaching the cholesteric alignment fixed layer previously formed on a base to the plastic film layer via an adhesive layer, and the like. As an adhesive forming the adhesive layer, typically, there is given a curable adhesive. Typical examples of the curable adhesive include a photocurable adhesive such as a UV-curable type, a moisture-curable adhesive, and a heat-curable adhesive. The thickness of the adhesive layer is preferably 1 μm to 10 μm, and more preferably 1 μm to 5 μm.

A-6. Polarizer

Any appropriate polarizer may be employed as the above polarizer in accordance with a purpose. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferable because of high polarized dichromaticity. A thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times the length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required.

Washing the polyvinyl alcohol-based film with water not only allows removal of contamination on a film surface or washes away an antiblocking agent, but also provides an effect of preventing nonuniformity such as uneven coloring by swelling of the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide or in a water bath.

A-7. Protective Layer

The first protective layer and the second protective layer are formed of any appropriate film which can be used as a protective layer for a polarizer. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof includes a thermosetting resin or a UV-curing resin such as a (meth)acrylic-based resin, an urethane-based resin, a (meth)acrylic urethane-based resin, an epoxy-based resin, or a silicone-based resin. Still another example thereof includes, for example, a glassy polymer such as a siloxane-based polymer. Further, a polymer film described in JP 2001-343529 A (WO 01/37007) may also be used. To be specific, the film can be formed of a resin composition containing a thermoplastic resin having a substituted or unsubstituted imide group on a side chain and a thermoplastic resin having a substituted or unsubstituted phenyl group and a nitrile group on a side chain. A specific example thereof includes a resin composition containing an alternate copolymer of isobutene and N-methylmaleimide and an acrylonitrile-styrene copolymer. The polymer film may be an extruded product of the resin composition, for example.

Glass transition temperature (Tg) of the (meth) acrylic resin is preferably 115° C. or higher, more preferably 120° C. or higher, still more preferably 125° C. or higher, and particularly preferably 130° C. or higher. This is because the (meth) acrylic resin having a glass transition temperature (Tg) of 115° C. or higher can be excellent in durability. The upper limit value of Tg of the (meth)acrylic resin is not particularly limited, but is preferably 170° C. or lower from the viewpoint of formability and the like.

As the (meth)acrylic resin, any appropriate (meth)acrylic resin can be adopted as long as the effects of the present invention are not impaired. Examples of the (meth)acrylic resin include poly(meth)acrylates such as methyl polymethacrylate, a methyl methacrylate-(meth)acrylic acid copolymer, a methyl methacrylate-(meth)acrylate copolymer, a methyl methacrylate-acrylate-(meth)acrylic acid copolymer, a methyl (meth)acrylate-styrene copolymer (MS resin, etc.), and a polymer having an alicyclic hydrocarbon group (e.g., a methyl methacrylate-cyclohexyl methacrylate copolymer, a methyl methacrylate-norbornyl(meth)acrylate copolymer). A preferred example includes $C_{1-6}$ alkyl poly (meth)acrylic acid such as polymethyl(meth)acrylate. A more preferred example includes a methyl methacrylate-based resin containing methyl methacrylate as a main component (50 to 100% by weight, preferably 70 to 100% by weight).

Specific examples of the (meth)acrylic resin include ACRYPET VH and ACRYPET VRL20A manufactured by Mitsubishi Rayon Co., Ltd., a (meth)acrylic resin having a ring structure in molecules described in JP 2004-70296 A, and a (meth)acrylic resin with high Tg obtained by intramolecular cross-linking or intramolecular cyclization reaction.

As the above (meth)acrylic resin, a (meth)acrylic resin having a lactone ring structure is particularly preferred because of high heat resistance, high transparency, and high mechanical strength.

Examples of the (meth)acrylic resin having the lactone ring structure include (meth)acrylic resins having a lactone ring structure described in JP 2000-230016 A, JP 2001-151814 A, JP 2002-120326 A, JP 2002-254544 A, and JP 2005-146084 A.

The mass average molecular weight (which may also be referred to as weight average molecular weight) of the (meth) acrylic resin having a lactone ring structure is preferably 1,000 to 2,000,000, more preferably 5,000 to 1,000,000, much more preferably 10,000 to 500,000, and particularly preferably 50,000 to 500,000.

The glass transition temperature (Tg) of the (meth)acrylic resin having the lactone ring structure is preferably 115° C. or higher, more preferably 125° C. or higher, still more preferably 130° C. or higher, particularly preferably 135° C. or higher, and most preferably 140° C. or higher. This is because the (meth)acrylic resin having a lactone ring structure and having Tg of 115° C. or higher can be excellent in durability. The upper limit value of the Tg of the (meth)acrylic resin having a lactone ring structure is not particularly limited, but is preferably 170° C. or lower from the viewpoint of formability and the like.

In this specification, the term "(meth)acrylic" refers to acrylic and/or methacrylic.

The first protective layer and the second protective layer are preferably transparent and colorless. The thickness direction retardation (Rth) of the second protective layer is preferably −90 nm to +90 nm, more preferably −80 nm to +80 nm, and much more preferably −70 nm to +70 nm.

As the thickness of the first protective layer and the second protective layer, any suitable thickness can be adopted as long as the above preferred thickness direction retardation Rth can be obtained. The thickness of the second protective layer is typically 5 mm or less, preferably 1 mm or less, more preferably 1 to 500 μm, and much more preferably 5 to 150 μm.

The side of the second protective layer opposite to the polarizer can be subjected to hard coat treatment, antireflection treatment, sticking prevention treatment, antiglare treatment, or the like, if required.

The thickness direction retardation (Rth) of the first protective layer provided between the polarizer and the optical compensation layer is preferably smaller than the above preferred value. As described above, in the case of a cellulose-based film generally used as a protective film, e.g., a triacetylcellulose film, the thickness direction retardation Rth is about 60 nm at a thickness of 80 μm. A cellulose-based film with large thickness direction retardation (Rth) can be subjected to appropriate treatment for decreasing the thickness direction retardation (Rth), thereby the first protective layer can be obtained in a preferred manner.

As treatment for decreasing the above thickness direction retardation (Rth), any suitable treatment method can be adopted. Examples thereof include a method of attaching a base made of polyethylene terephthalate, polypropylene, or stainless steel with a solvent such as cyclopentanone or methylethylketone applied thereto to a general cellulose-based film, drying the laminate by heating (for example, for about 3 to 10 minutes at about 80 to 150° C.), and thereafter peeling the base; and a method of applying a solution in which a norbornene-based resin, an acrylic resin, or the like is dissolved in a solvent such as cyclopentanone or methylethylketone to a general cellulose-based film, dying the laminate by heating (for example, for about 3 to 10 minutes at 80 to 150° C.), and thereafter peeling the applied film.

Examples of materials forming the above cellulose-based film preferably include aliphatic acid-substituted cellulose-based polymers such as diacetylcellulose and triacetylcellulose. Although the acetic acid substitution degree in generally used triacetylcellulose is about 2.8, the thickness direction retardation (Rth) can be controlled to be small preferably by controlling the acetic acid substitution degree to 1.8 to 2.7, and more preferably by controlling the propionic acid substitution degree to 0.1 to 1.

By adding a plasticizer such as dibutylphthalate, p-toluenesulfonanilide, or acetyltriethyl citrate to the above aliphatic acid-substituted cellulose-based polymer, the thickness direction retardation (Rth) can be controlled to be small. The adding amount of the plasticizer is preferably 40 parts by weight or less, more preferably 1 to 20 parts by weight, and much more preferably 1 to 15 parts by weight with respect to 100 parts by weight of the aliphatic acid-substituted cellulose-based polymer.

The treatment methods of decreasing the above thickness direction retardation (Rth) may be used in an appropriate combination. The thickness direction retardation Rth(550) of the first protective layer obtained by the treatment is preferably −20 nm to +20 nm, more preferably −10 nm to +10 nm, much more preferably −6 nm to +6 nm, and particularly preferably −3 nm to +3 nm. The in-plane retardation Re(550) of the first protective layer is preferably 0 nm or more and 10 nm or less, more preferably 0 nm or more and 6 nm or less, and much more preferably 0 nm or more and 3 nm or less.

As the thickness of the first protective layer, any suitable thickness can be adopted as long as the above preferred thickness direction retardation Rth can be obtained. The thickness of the first protective layer is preferably 20 to 200 μm, more preferably 30 to 100 μm, and much more preferably 35 to 95 μm.

A-8. Lamination Method

As the method of laminating each layer (film), any suitable method can be adopted. Specifically, each layer is laminated via any suitable pressure-sensitive adhesive layer or adhesive layer. A typical example of the pressure-sensitive adhesive layer includes an acrylic pressure-sensitive adhesive layer. The thickness of the acrylic pressure-sensitive adhesive layer is preferably 1 to 30 μm and more preferably 3 to 25 μm.

As described above, in the case where the first optical compensation layer 12 functions as a protective layer of the polarizer 11, the polarizer and the first optical compensation layer are laminated via any suitable adhesive layer. As described above, in the case of producing a first optical compensation layer having a refractive index ellipsoid of nx>ny>nz by fixed-end biaxial stretching, a slow axis can be generated in a short direction. On the other hand, an absorption axis direction of the polarizer can be generated in a stretching direction (longitudinal direction) Thus, in the case where the first optical compensation layer and the polarizer are placed so that a slow axis of the first optical compensation layer is perpendicular to an absorption axis of the polarizer as in the present invention, the first optical compensation layer and the polarizer can be laminated continuously by roll-to-roll. Examples of the adhesive used for lamination of the polarizer and the first optical compensation layer include adhesives containing a polyvinyl alcohol-based resin, a cross-linking agent, and a metal compound colloid.

Examples of the above polyvinyl alcohol-based resin include a polyvinyl alcohol resin and a polyvinyl alcohol resin containing an acetoacetyl group. The polyvinyl alcohol resin containing an acetoacetyl group is preferred since durability can be enhanced.

Examples of the above-mentioned polyvinyl alcohol-based resin include: a saponified polyvinyl acetate and derivatives of the saponified product; a saponified product of a copolymer obtained by copolymerizing vinyl acetate with a monomer having copolymerizability; and a modified polyvinyl alcohol obtained by modifying polyvinyl alcohol to acetal, urethane, ether, graft, or phosphate. Examples of the monomer include unsaturated carboxylic acids such as maleic acid (anhydrides), fumaric acid, crotonic acid, itaconic acid, and (meth)acrylic acid and esters thereof; α-olefin such as ethylene and propylene; (sodium) (meth)allylsulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. Those resins may be used alone or in combination.

The polyvinyl alcohol-based resin has an average degree of polymerization of preferably about 100 to 5,000, and more preferably 1,000 to 4,000, from a viewpoint of adhesion property. The polyvinyl alcohol-based resin has an average degree of saponification of preferably about 85 to 100 mol %, and more preferably 90 to 100 mol %, from a viewpoint of adhesion property.

The above polyvinyl alcohol-based resin containing an acetoacetyl group is obtained, for example, by reacting a polyvinyl alcohol-based resin with diketene by any method. Specific examples thereof include a method of adding diketene to a dispersion in which a polyvinyl alcohol-based resin is dispersed in a solvent such as acetic acid, a method of adding diketene to a solution in which a polyvinyl alcohol-based resin is dissolved in a solvent such as dimethylformamide or dioxane, and a method of bringing diketene gas or liquid diketene into direct contact with a polyvinyl alcohol-based resin.

The acetoactyl group modification degree of the above polyvinyl alcohol-based resin containing an acetoacetyl group is typically 0.1 mol % or more, preferably about 0.1 to 40 mol %, more preferably 1 to 20 mol %, and particularly preferably 2 to 7 mol %. When the modification degree is less than 0.1 mol %, water resistance may be insufficient. When the modification degree exceeds 40 mol %, the effect of the enhancement of water resistance is small. The acetoacetyl group modification degree is a value measured by NMR.

As the cross-linking agent, any appropriate cross-linking agent may be employed. Preferably, a compound having at least two functional groups each having reactivity with a polyvinyl alcohol-based resin can be used as a cross-linking agent. Examples of the compound include: alkylene diamines having an alkylene group and two amino groups such as ethylene diamine, triethylene diamine, and hexamethylene diamine; isocyanates such as tolylene diisocyanate, hydrogenated tolylene diisocyanate, trimethylol propane tolylene diisocyanate adduct, triphenylmethane triisocyanate, methylene bis(4-phenylmethane)triisocyanate, isophorone diisocyanate, and ketoxime blocked compounds thereof or phenol blocked compounds thereof; epoxides such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylolurea, methylolmelamine, alkylated methylolurea, alkylated methylol melamine, acetoguanamine, or benzoguanamine; and salts of sodium, potassium, divalent metals or trivalent metals such as magnesium, calcium, aluminum, iron, and nickel and oxides thereof. Of those, an amino-formaldehyde resin and dialdehydes are preferred. As the amino-formaldehyde resin, a compound having a methylol group is preferred, and as the dialdehydes, glyoxal is preferred. Of those, a compound having a methylol group is preferred, and methylol melamine is particularly preferred.

The blending amount of the above cross-linking agent can be appropriately set depending upon the kind of the above polyvinyl alcohol-based resin and the like. Typically, the blending amount of the above cross-linking agent is about 10 to 60 parts by weight, and preferably 20 to 50 parts by weight based on 100 parts by weight of the polyvinyl alcohol-based resin. This is because the cross-linking agent in such a blending amount is excellent in adhesion. In the case where the blending amount of the cross-linking agent is large, the reaction of the cross-linking agent proceeds in a short period of time, and an adhesive tends to be gelled. Consequently, the usable time (pot life) of the adhesive becomes extremely short, which may make it difficult to use the adhesive industrially. The adhesive of the embodiment of the present invention contains a metal compound colloid described later, so the adhesive can be used with good stability even in the case where the blending amount of the cross-linking agent is large.

The above metal compound colloid can have a configuration in which metal compound fine particles are dispersed in a dispersion medium, and can be electrostatically stabilized due to the interaction between the same charges of the fine particles to have stability perpetually. The average particle diameter of the fine particles forming a metal compound colloid can be any suitable value as long as the optical properties such as polarization properties are not adversely influenced. The average particle diameter is preferably 1 to 100 nm, and more preferably 1 to 50 nm. This is because the fine particles can be dispersed uniformly in an adhesive layer to keep adhesion, and the occurrence of knick can be suppressed. The term "knick" refers to local uneven defects formed at an interface between a polarizer and a protective layer (a first optical compensation layer).

As the above metal compound, any suitable compound can be adopted. Examples of the metal compound include a metal oxide such as alumina, silica, zirconia, or titania; a metal salt such as aluminum silicate, calcium carbonate, magnesium silicate, zinc carbonate, barium carbonate, or calcium phosphate; and a mineral such as cerite, talc, clay, or kaolin. Among them, alumina is preferred.

The metal compound colloid is typically present in a state of a colloid solution in which the metal compound colloid is dispersed in a dispersion medium. Examples of the dispersion medium include water and alcohols. The concentration of a solid content in a colloid solution is typically about 1 to 50% by weight. The colloid solution can contain acids such as nitric acid, hydrochloric acid, and acetic acid as a stabilizer.

The blending amount of the above metal compound colloid (solid content) is preferably 200 parts by weight or less, more preferably 10 to 200 parts by weight, much more preferably 20 to 175 parts by weight, and most preferably 30 to 150 parts by weight based on 100 parts by weight of the polyvinyl alcohol-based resin. This is because such a blending amount can suppress the occurrence of knick while keeping adhesion.

The adhesive of the embodiment of the present invention can contain: a coupling agent such as a silane coupling agent and a titanium coupling agent; various kinds of tackifiers; a UV absorber; an antioxidant; and stabilizers such as a heat-resistant stabilizer and a hydrolysis-resistant stabilizer.

The form of the adhesive of the embodiment of the present invention is preferably an aqueous solution (resin solution). The resin concentration is preferably 0.1 to 15% by weight and more preferably 0.5 to 10% by weight in view of application property, storage stability, and the like. The viscosity of the resin solution is preferably 1 to 50 mPa·s. The pH of the resin solution is preferably 2 to 6, more preferably 2.5 to 5, much more preferably 3 to 5, and most preferably 3.5 to 4.5. Generally, the surface charge of the metal compound colloid can be controlled by adjusting the pH. The surface charge is preferably a positive charge. Due to the presence of a positive charge, the occurrence of knick can be suppressed.

As a method of preparing the above resin solution, any suitable method can be adopted. For example, there is a method of previously mixing a polyvinyl alcohol-based resin with a cross-linking agent and adjusting the mixture to an appropriate concentration, and blending a metal compound colloid with the resultant mixture. Alternatively, after a polyvinyl alcohol-based resin is mixed with a metal compound colloid, a cross-linking agent can be mixed with the mixture considering a use time and the like. The concentration of the resin solution may be adjusted after preparation of a resin solution.

B. Liquid Crystal Panel

B-1. Whole Configuration of Liquid Crystal Panel

Figure 2A:
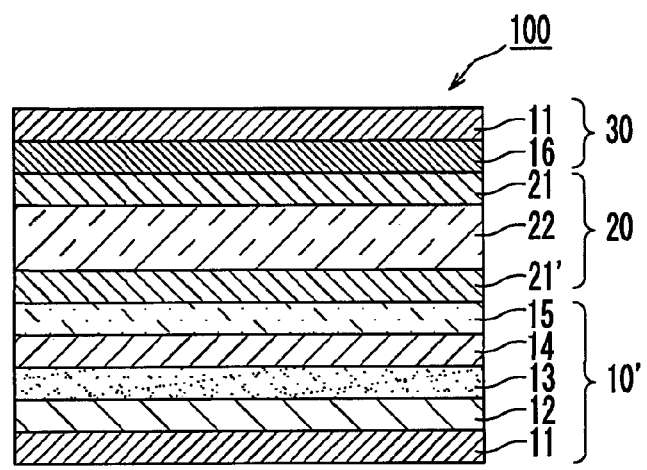
FIG. 2A is a schematic cross-sectional view of a liquid crystal panel according to one embodiment of the present invention.

FIG. 2A is a schematic cross-sectional view of a liquid crystal panel according to one embodiment of the present invention. A liquid crystal panel 100 includes a liquid crystal cell 20, a laminated optical film 10' of the present invention placed on one side (backlight side in the illustrated example) of the liquid crystal cell 20, and a laminated film 30 placed on the other side (viewer side in the illustrated example) of the liquid crystal cell 20. The laminated film 30 includes the polarizer 11 and a fifth optical compensation layer 16. In the laminated film 30, if required, a first protective layer is provided between the polarizer 11 and the fifth optical compensation layer 16, and a second protective layer is provided on the side of the polarizer 11 opposite to the fifth optical compensation layer 16. Although not shown, the laminated film 30 can further include any suitable another optical compensation layer. As shown, the laminated optical film 10' and the laminated film 30 are placed so that the sides on which the optical compensation layers are provided are placed on the liquid crystal cell 20 side.

Figure 2B:
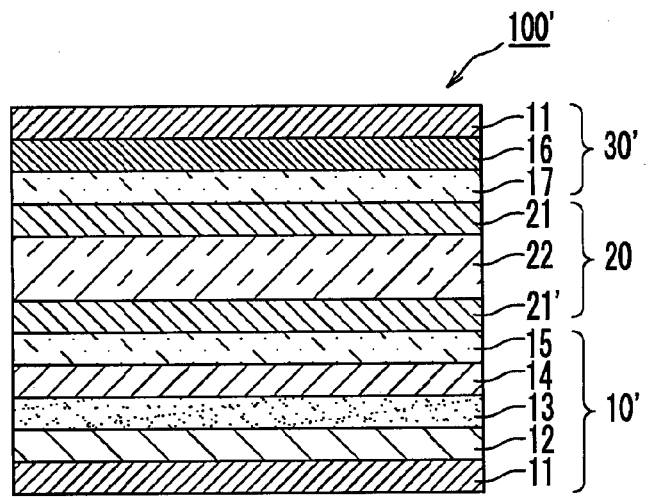
FIG. 2B is a schematic cross-sectional view of a liquid crystal panel according to another preferred embodiment of the present invention.

FIG. 2B is a schematic cross-sectional view of a liquid crystal panel according to another embodiment of the present invention. A liquid crystal panel 100' includes a liquid crystal cell 20, a laminated optical film 10' of the present invention placed on one side (backlight side in the illustrated example) of the liquid crystal cell 20, and a laminated film 30' placed on the other side (viewer side in the illustrated example) of the liquid crystal cell 20. The laminated film 30' includes the polarizer 11, the fifth optical compensation layer 16, and a sixth optical compensation layer 17. In the laminated film 30', if required, a first protective layer is provided between the polarizer 11 and the fifth optical compensation layer 16, and a second protective layer is provided on the side of the polarizer 11 opposite to the fifth optical compensation layer 16. Further, although not shown, the laminated film 30' may further include any suitable another optical compensation layer. As shown, the laminated optical film 10' and the laminated film 30' are placed so that the sides on which the optical compensation layers are provided are placed on the liquid crystal cell 20 side.

Unlike the illustrated examples, the laminated optical film 10 may be placed instead of the laminated optical film 10'. Further, unlike the illustrated examples, the laminated optical film 10' (10) may be placed on the viewer side, and the laminated films 30, 30' may be placed on the backlight side.

The fifth optical compensation layer 16 constituting the laminated films 30, 30' is laminated on the polarizer 11 constituting the laminated films 30, 30' so that the slow axis of the fifth optical compensation layer 16 defines any suitable angle with respect to the absorption axis of the polarizer 11. The angle to be defined is preferably 30 to 60°, more preferably 35 to 55°, particularly preferably 40 to 50°, and most preferably 43 to 47°.

It is preferred that the polarizers 11, 11 placed on both sides of the liquid crystal cell 20 of the liquid crystal panels 100, 100' are placed so that the absorption axes of the polarizers 11, 11 are substantially perpendicular to each other.

B-2. Liquid Crystal Cell

The liquid crystal cell 20 includes: a pair of substrates 21 and 21'; and a liquid crystal layer 22 as a display medium arranged between the substrates 21 and 21'. One substrate (color filter substrate) 21 is provided with a color filter (not shown) and a black matrix (not shown). The other substrate (active matrix substrate) 21' is provided with: a switching element (typically, TFT) for controlling electrooptic characteristics of liquid crystal; a scanning line for providing a gate signal to the switching element and a signal line for providing a source signal thereto; and a pixel electrode (all not shown). The color filter may be provided on the active matrix substrate 21'. A space (cell gap) between the substrates 21 and 21' is controlled by a spacer (not shown). An alignment film (not shown) formed of, for example, polyimide is provided on a side of each of the substrates 21 and 21' in contact with the liquid crystal layer 22.

As a drive mode of the liquid crystal cell 20, any suitable drive modes may be employed. The drive mode is preferably a VA mode. FIG. 3 is a schematic sectional view illustrating an alignment state of liquid crystal molecules in a VA mode. As shown in FIG. 3A, liquid crystal molecules are aligned vertically to the substrates 21 and 21' without application of a voltage. Such vertical alignment is realized by arranging nematic liquid crystal having negative dielectric anisotropy between the substrates each having a vertical alignment film formed thereon (not shown). When light enters from a surface of one substrate 21 in such a state, linear polarized light incident upon the liquid crystal layer 22 through one polarizer 11 advances along a longitudinal direction of the vertically aligned liquid crystal molecules. No birefringence occurs in the longitudinal direction of the liquid crystal molecules, and thus the incident light advances without changing a polarization direction and is absorbed by the other polarizer 11 having an absorption axis perpendicular to the one polarizer 11. In this way, a dark state is displayed without application of a voltage (normally black mode). As shown in FIG. 3B, longitudinal axes of the liquid crystal molecules are aligned parallel to the substrate surfaces when a voltage is applied between the electrodes. The liquid crystal molecules in such a state exhibit birefringence with respect to linear polarized light incident upon the liquid crystal layer 22 through the one polarizer 11, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the other polarizer 11, and a bright state is displayed. Upon termination of voltage application, the display is returned to a dark state by an alignment restraining force. An applied voltage is changed to control inclination of the liquid crystal molecules, so as to change an intensity of light transmission from the other polarizer 11. As a result, display of gradation can be realized.

B-3. Fifth Optical Compensation Layer

The fifth optical compensation layer 16 can function as a so-called λ/4 plate. The fifth optical compensation layer can convert, for example, linearly polarized light with a particular wavelength into circularly polarized light (or circularly polarized light into linearly polarized light) as a λ/4 plate. The fifth optical compensation layer can mainly compensate for the liquid crystal cell. The fifth optical compensation layer can have optical characteristics (a refractive index ellipsoid, an in-plane retardation, an Nz coefficient, etc.) same as those of the third optical compensation layer. Further, the fifth optical compensation layer can be formed of a material same as that of the third optical compensation layer.

B-4. Sixth Optical Compensation Layer

The sixth optical compensation layer 17 has a refractive index ellipsoid of nx=ny>nz. The sixth optical compensation layer can mainly compensate for a liquid crystal cell. The thickness direction retardation $Rth_6$ of the sixth optical compensation layer can be set to be any suitable value depending upon the configuration of the liquid crystal panel and the like. The detail thereof will be described in Section B-5. The sixth optical compensation layer can be formed of a material same as that of the fourth optical compensation layer.

B-5. Regarding Thickness Direction Retardations of Fourth Optical Compensation Layer and Sixth Optical Compensation Layer The fourth optical compensation layer and the sixth optical compensation layer each have a refractive index ellipsoid of nx=ny>nz. A layer having such a refractive index ellipsoid may be referred to as "negative C plate". As shown in FIG. 2A, in the case where one layer of negative C plate is provided (the fourth optical compensation layer 15 in the illustrated example) in the liquid crystal panel, the thickness direction retardation Rth thereof is preferably 50 to 600 nm, more preferably 100 to 540 nm, and particularly preferably 150 to 500 nm. On the other hand, as shown in FIG. 2B, in the case where a plurality of layers of negative C plates (the fourth optical compensation layer 15 and the sixth optical compensation layer 17 in the illustrated example) are provided in the liquid crystal panel, the sum of the thickness direction retardations Rth thereof is preferably 50 to 600 nm, more preferably 100 to 540 nm, and particularly preferably 150 to 500 nm. Rth of each negative C plate can be set to be any suitable value. Specifically, as shown in FIG. 2B, in the case where the fourth optical compensation layer and the sixth optical compensation layer are provided as negative C plates (two layers are provided), $Rth_4$ is preferably 25 to 300 nm, more preferably 50 to 270 nm, and particularly preferably 75 to 250 nm. $Rth_6$ is preferably 25 to 300 nm, more preferably 50 to 270 nm, and particularly preferably 75 to 250 nm.

B-6. Lamination Method

As the lamination method of each layer (film), any suitable method can be adopted. Specifically, each layer is laminated via any suitable pressure-sensitive adhesive layer or adhesive layer. A typical example of the pressure-sensitive adhesive layer includes an acrylic pressure-sensitive adhesive layer. The thicknesses of the acrylic pressure-sensitive adhesive layers provided on both sides of the liquid crystal cell are preferably 1 μm to 100 μm, more preferably 1 μm to 50 μm, and still more preferably 3 μm to 30 μm. The thicknesses of the other acrylic pressure-sensitive adhesive layers are preferably 1 to 30 μm and more preferably 3 to 25 μm.

Hereinafter, the present invention is described specifically by way of examples. However, it should be noted that the present invention is not limited to those examples. The measurement methods of the respective properties are as follows.

(1) Measurement of Retardation Value

A retardation value was automatically measured using KOBRA-WPR manufactured by Oji Scientific Instruments. The measurement wavelength was 590 nm or 550 nm, and the measurement temperature was 23° C.

(2) Measurement 1 of Contrast Using optical property parameters of each optical compensation layer actually produced and measured, a computer simulation was conducted with respect to the liquid crystal panels in the respective examples and comparative examples. For the simulation, a simulator for a liquid crystal display unit "LCD MASTER" manufactured by Shintech Inc. was used.

(3) Measurement 2 of Contrast

A white image and a black image were displayed on a liquid crystal display apparatus and measured by "Conoscope" (trade name) manufactured by AUTRONIC MELCHERS.

Example 1

Polarizing Plate

A polyvinyl alcohol film was dyed in an aqueous solution containing iodine, and thereafter, the resultant film was uniaxially stretched by 6 times between rolls having different speed ratios in an aqueous solution containing boric acid to obtain a polarizer. Triacetylcellulose films (thickness: 40 μm, KC4UYW (trade name) manufactured by Konica Minola Holdings Inc.) were attached as protective layers on both sides of the polarizer via a polyvinyl alcohol-based adhesive (thickness: 0.1 μm). The in-plane retardation Re(550) of the protective layer was 0.9 nm and the thickness direction retardation Rth(550) was 1.2 nm. Thus, a polarizing plate was produced. Re(550) shows a value measured with light having a wavelength of 550 nm at 23° C.

First Optical Compensation Layer

A long norbornene-based resin film (Zeonor (trade name) manufactured by Zeon Corporation, thickness: 60 μm, photoelastic coefficient: $3.1 \times 10^{-12}$ m$^2$/N) was subjected to fixed-end transverse uniaxial stretching by 3.0 times at 158° C., whereby a long-shaped film was produced. The in-plane retardation $Re_1$ of the obtained film was 110 nm, the thickness direction retardation $Rth_1$ thereof was 143 nm, and the Nz coefficient ($Rth_1/Re_1$) thereof was 1.3. The obtained film was punched to a size corresponding to a liquid crystal cell described later to obtain a first optical compensation layer.

Second Optical Compensation Layer

A pellet-shaped resin of a styrene-maleic anhydride copolymer ("Dylark D232" (trade name) manufactured by Nova Chemicals Japan Ltd.) was extruded at 270° C., using a uniaxial extruder and a T-die, and the sheet-shaped molten resin was cooled with a cooling drum to obtain a film with a thickness of 100 μm. The film was subjected to free-end uniaxial stretching in a transport direction at a temperature of 130° C. and a stretching ratio of 1.6 times, using a roll stretching machine, whereby a film having a fast axis in the transport direction was obtained (longitudinal stretching step).

The obtained film was subjected to fixed-end uniaxial stretching in a width direction at a temperature of 135° C. using a tenter stretching machine so that the film width was 1.6 times the film width after the longitudinal stretching, whereby a biaxially stretched film with a thickness of 50 μm was obtained (transverse stretching step).

The retardation film thus obtained had a fast axis in the transport direction, and the refractive index ellipsoid thereof had a relationship of nz>nx>ny, the in-plane retardation $Re_2$ was 19 nm, the thickness direction retardation $Rth_2$ was −80 nm, and the Nz coefficient ($Rth_2/Re_2$) was −4.2. The obtained retardation film was punched to a size corresponding to a liquid crystal cell described later to obtain a second optical compensation layer.

Third Optical Compensation Layer

A long norbornene-based resin film (Zeonor (trade name) manufactured by Zeon Corporation, thickness: 40 μm, photoelastic coefficient: $3.10 \times 10^{-12}$ m$^2$/N) was uniaxially stretched by 1.52 times at 140° C., whereby a long film was produced. The thickness of the obtained film was 35 μm, the in-plane retardation $Re_3$ thereof was 140 nm, and the thickness direction retardation $Rth_3$ thereof was 140 nm. The obtained film was punched to a size corresponding to a liquid crystal cell described later to obtain a third optical compensation layer.

Fourth Optical Compensation Layer 90 parts by weight of the nematic liquid crystalline compound represented by the following Chemical Formula (1), 10 parts by weight of the chiral agent represented by the following Chemical Formula (2), 5 parts by weight of a photopolymerization initiator (Irgacure 907 manufactured by Ciba Specialty Chemicals Inc.), and 300 parts by weight of methyl ethyl ketone were mixed so as to be uniform, whereby a liquid crystal-application liquid was prepared. Next, the liquid crystal-application liquid was applied on a substrate (biaxially stretched PET film), heat-treated at 80° C. for 3 minutes, and polymerized by irradiation with UV-light, whereby a cholesteric alignment fixed layer to be a fourth optical compensation layer was formed on the substrate. The thickness of the cholesteric alignment fixed layer was 2.2 μm, the thickness direction retardation $Rth_4$ was 120 nm, and the in-plane retardation $Re_4$ was substantially zero.

(Chemical Formula 2)

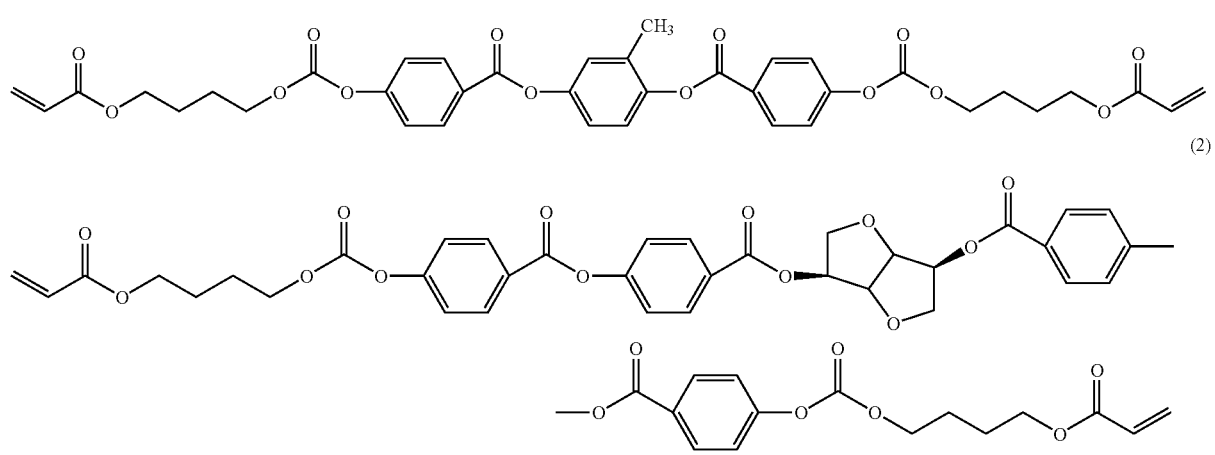

Fifth Optical Compensation Layer

The film obtained in the same way as in the third optical compensation layer was used as a fifth optical compensation layer ($Re_5$: 140 nm, $Rth_5$: 140 nm)

Sixth Optical Compensation Layer

The cholesteric alignment fixed layer obtained in the same way as in the fourth optical compensation layer was used as a sixth optical compensation layer ($Re_6$: substantially zero, $Rth_6$: 120 nm)

Laminated Optical Film A

A cholesteric alignment fixed layer to be the fourth optical compensation layer was attached to the third optical compensation layer obtained above with an isocyanate-based adhesive (thickness: 5 μm), and the substrate (biaxially stretched PET film) was removed, whereby a laminate 1 in which the cholesteric alignment fixed layer was transferred to the third optical compensation layer was obtained.

The second optical compensation layer, the first optical compensation layer, and the polarizing plate were laminated in the stated order on the third optical compensation layer side of the laminate 1 via an acrylic pressure-sensitive adhesive (thickness: 12 μm). At this time, those layers were laminated so that a slow axis of the first optical compensation layer was perpendicular to an absorption axis of the polarizer of the polarizing plate, a slow axis of the second optical compensation layer was perpendicular to the absorption axis of the polarizer of the polarizing plate, and a slow axis of the third optical compensation layer was 45° in a clockwise direction with respect to the absorption axis of the polarizer of the polarizing plate, whereby a laminated optical film A was produced.

Laminated Film B

A cholesteric alignment fixed layer to be the sixth optical compensation layer was attached to the fifth optical compensation layer obtained above with an isocyanate-based adhesive (thickness: 5 μm), and the substrate (biaxially stretched PET film) was removed, whereby a laminate 2 in which the cholesteric alignment fixed layer was transferred to the fifth optical compensation layer was obtained.

The polarizing plate was laminated on the fifth optical compensation layer side of the laminate 2 via an acrylic pressure-sensitive adhesive (thickness: 12 μm). At this time, those layers were laminated so that a slow axis of the fifth optical compensation layer was 45° in a clockwise direction with respect to the absorption axis of the polarizer of the polarizing plate, whereby a laminated film B was produced.

Liquid Crystal Panel

A liquid crystal cell was removed from a Playstation Portable (with a liquid crystal cell in a VA mode mounted thereon) manufactured by Sony Corporation, and the laminated optical film A was attached to the backlight side of the liquid crystal cell via an acrylic pressure-sensitive adhesive (thickness: 20 μm). At this time, the laminated optical film A was attached so that the fourth optical compensation layer was placed on the liquid crystal cell side. Further, the laminated film B was attached to the viewer side of the liquid crystal cell via an acrylic pressure-sensitive adhesive (thickness: 20 μm). At this time, the laminated film B was attached so that the sixth optical compensation layer was placed on the liquid crystal cell side. Further, the laminated film B was laminated so that an absorption axis of the polarizer of the laminated optical film A was perpendicular to an absorption axis of the polarizer of the laminated film B. Specifically, the lamination was performed so that, in a clockwise direction with the absorption axis of the polarizer on the viewer side being a reference (0°), the slow axis of the fifth optical compensation layer was 45°, the slow axis of the third optical compensation layer was 135°, the slow axis of the second optical compensation layer was 0°, the slow axis of the first optical compensation layer was 0°, and the absorption axis of the polarizer on the backlight side was 90°. Thus, a liquid crystal panel was produced.

Figure 5:
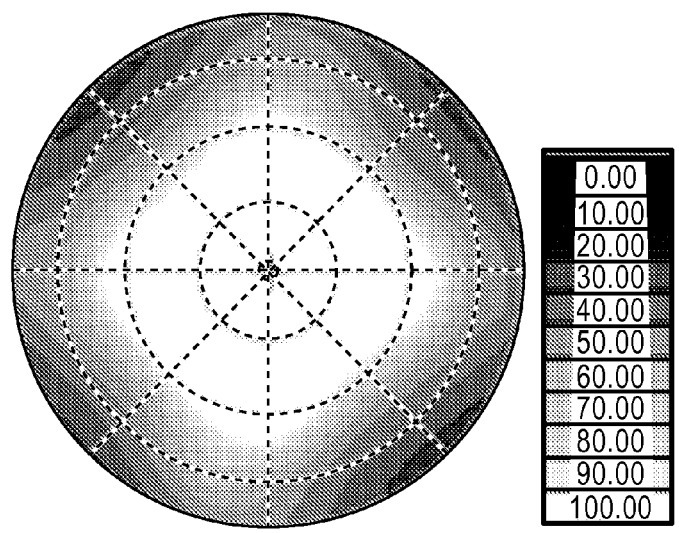
FIG. 5 is a contrast contour map showing viewing angle dependence of a contrast of the liquid crystal panel in Example 1 of the present invention.

Regarding the viewing angle dependency of a contrast of the liquid crystal display apparatus using the liquid crystal panel, a computer simulation was conducted. FIG. 4 shows the results. Further, an actual measurement of the viewing angle dependency of a contrast of the liquid crystal display apparatus produced using the liquid crystal panel thus obtained was performed. FIG. 5 shows the results.

Example 2

Laminated Optical Film C

A laminated optical film C was obtained in the same way as in the laminated optical film A except that the lamination was performed so that the slow axis of the second optical compensation layer was parallel to the absorption axis of the polarizer of the polarizing plate.

Liquid Crystal Panel

A liquid crystal panel was obtained in the same way as in Example 1, except for using the laminated optical film C instead of the laminated optical film A. Specifically, the lamination was performed so that, in a clockwise direction with the absorption axis of the polarizer on the viewer side being a reference (0°), the slow axis of the fifth optical compensation layer was 45°, the slow axis of the third optical compensation layer was 135°, the slow axis of the second optical compensation layer was 90°, the slow axis of the first optical compensation layer was 0°, and the absorption axis of the polarizer on the backlight side was 90°, whereby a liquid crystal panel was obtained.

Figure 6:
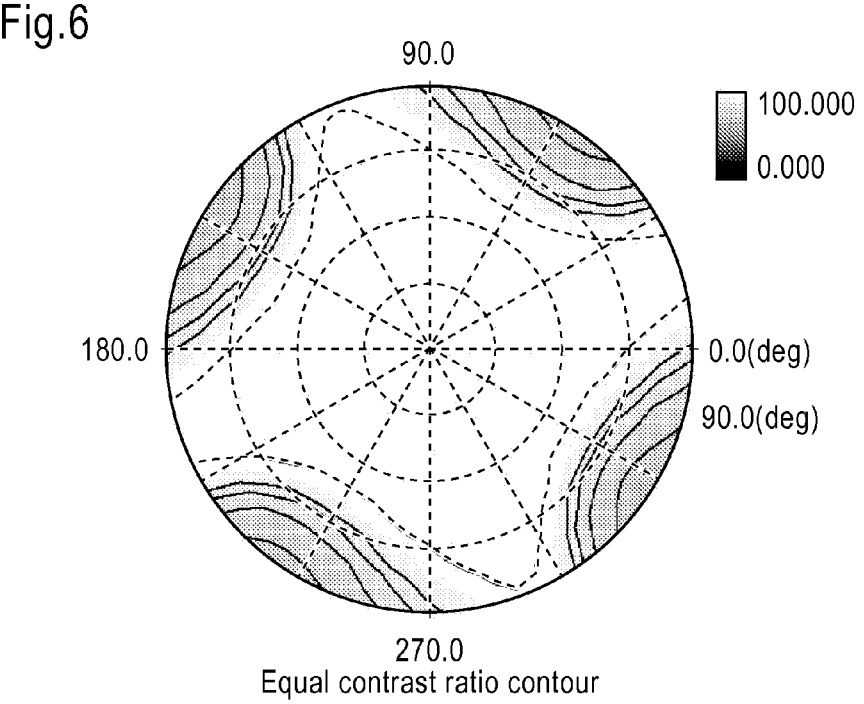
FIG. 6 shows the results of a computer simulation regarding viewing angle dependence of a contrast of a liquid crystal panel in Example 2 of the present invention.
Figure 7:
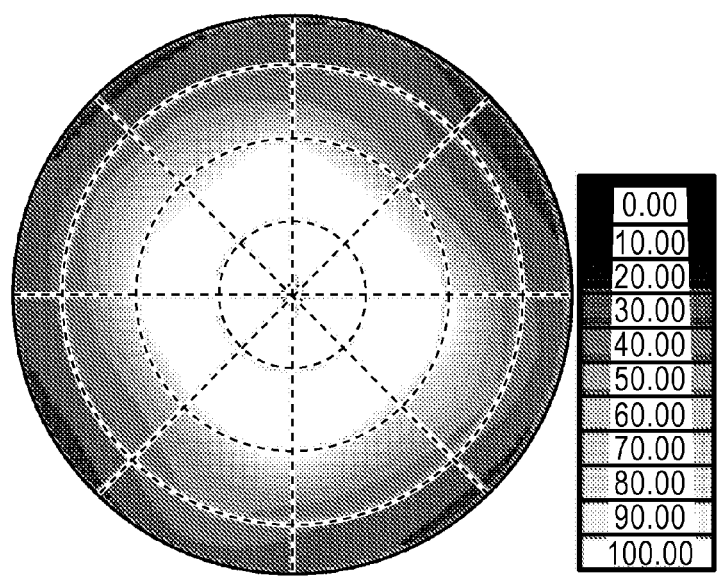
FIG. 7 is a contrast contour map showing viewing angle dependence of a contrast of the liquid crystal panel in Example 2 of the present invention.

Regarding the viewing angle dependency of a contrast of the liquid crystal display apparatus using the liquid crystal panel, a computer simulation was conducted. FIG. 6 shows the results. Further, an actual measurement of the viewing angle dependency of a contrast of the liquid crystal display apparatus produced using the liquid crystal panel thus obtained was performed. FIG. 7 shows the results.

Example 3

Laminated Optical Film D

A laminated optical film D is obtained in the same way as in the laminated optical film A except for using the following film as the second optical compensation layer.

Second Optical Compensation Layer

A second optical compensation layer was obtained in the same way as in Example 1, except for stretching the film longitudinally by a stretching ratio of 1.59 times and stretching the film transversally by a stretching ratio of 1.59 times. Note that the refractive index ellipsoid of the film had a relationship of nz>nx>ny, and the in-plane retardation $Re_2$ thereof was 10 nm, the thickness direction retardation $Rth_2$ thereof was −80 nm, and the Nz coefficient ($Rth_2/Re_2$) thereof was −8.0.

Liquid Crystal Panel

A liquid crystal panel is obtained in the same way as in Example 1, except for using the laminated optical film D instead of the laminated optical film A.

Figure 8:
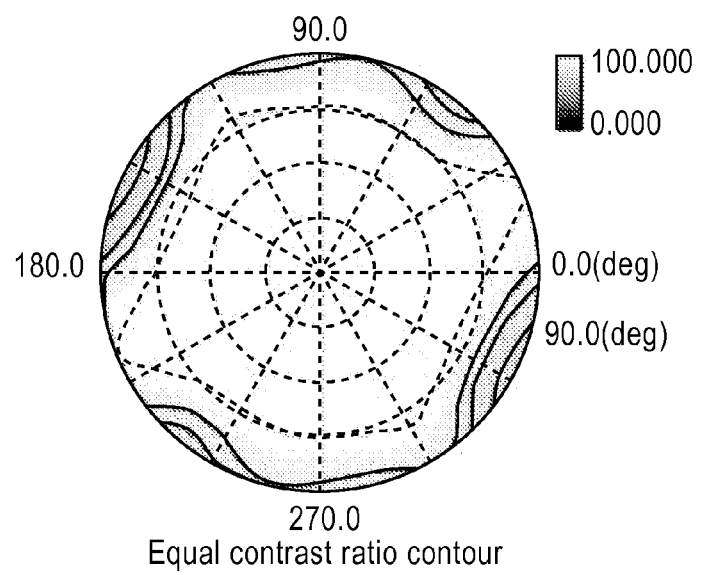
FIG. 8 shows the results of a computer simulation regarding viewing angle dependence of a contrast of a liquid crystal panel in Example 3 of the present invention.

Regarding the viewing angle dependency of a contrast of the liquid crystal display apparatus using the liquid crystal panel, a computer simulation was conducted. FIG. 8 shows the results.

Example 4

Laminated Optical Film E

A laminated optical film E is obtained in the same way as in the laminated optical film A except for using the following film as the second optical compensation layer.

Second Optical Compensation Layer

A second optical compensation layer was obtained in the same way as in Example 1, except for stretching the film longitudinally by a stretching ratio of 1.61 times and stretching the film transversally by a stretching ratio of 1.61 times. Note that the refractive index ellipsoid of the film had a relationship of nz>nx>ny, and the in-plane retardation $Re_2$ thereof was 30 nm, the thickness direction retardation $Rth_2$ thereof was −80 nm, and the Nz coefficient ($Rth_2/Re_2$) thereof was −2.7.

Liquid Crystal Panel

A liquid crystal panel is obtained in the same way as in Example 1, except for using the laminated optical film E instead of the laminated optical film A.

Figure 9:
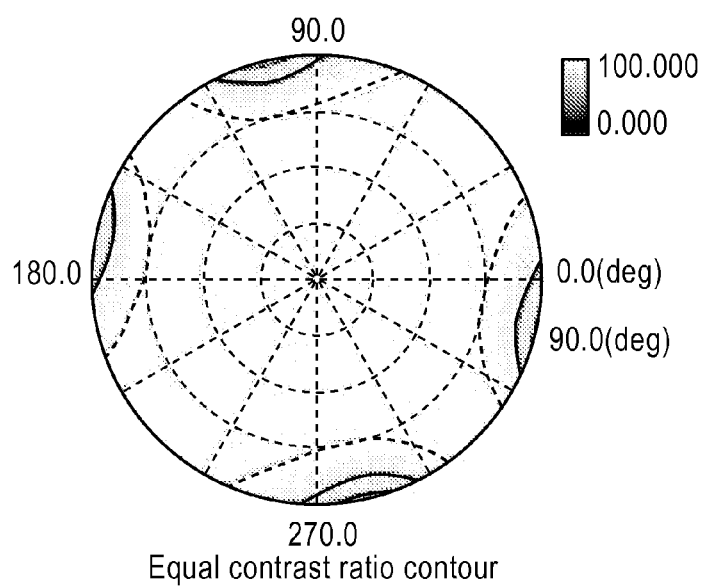
FIG. 9 shows the results of a computer simulation regarding viewing angle dependence of a contrast of a liquid crystal panel in Example 4 of the present invention.

Regarding the viewing angle dependency of a contrast of the liquid crystal display apparatus using the liquid crystal panel, a computer simulation was conducted. FIG. 9 shows the results.

Example 5

Laminated Optical Film F

A laminated optical film F is obtained in the same way as in the laminated optical film A except for using the following film as the second optical compensation layer.

Second Optical Compensation Layer

A second optical compensation layer was obtained in the same way as in Example 1, except for stretching the film longitudinally by a stretching ratio of 1.62 times and stretching the film transversally by a stretching ratio of 1.62 times. Note that the refractive index ellipsoid of the film had a relationship of nz>nx>ny, and the in-plane retardation $Re_2$ thereof was 40 nm, the thickness direction retardation $Rth_2$ thereof was −80 nm, and the Nz coefficient ($Rth_2/Re_2$) thereof was −2.0.

Liquid Crystal Panel

A liquid crystal panel is obtained in the same way as in Example 1, except for using the laminated optical film F instead of the laminated optical film A.

Figure 10:
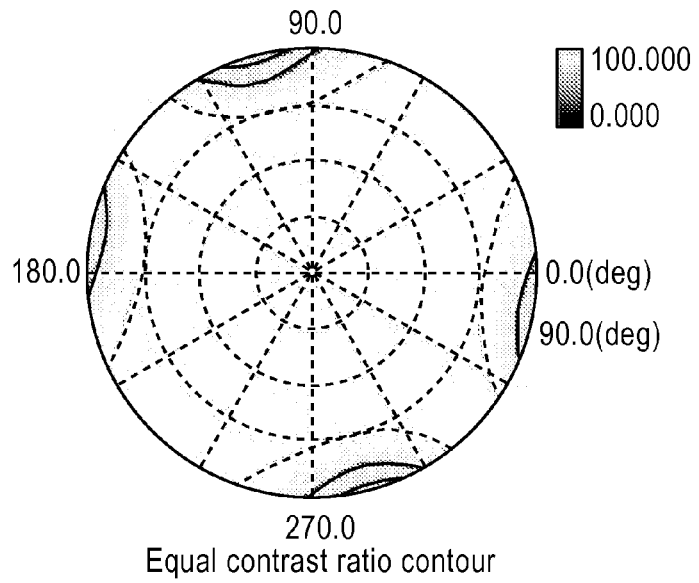
FIG. 10 shows the results of a computer simulation regarding viewing angle dependence of a contrast of a liquid crystal panel in Example 5 of the present invention.

Regarding the viewing angle dependency of a contrast of the liquid crystal display apparatus using the liquid crystal panel, a computer simulation was conducted. FIG. 10 shows the results.

Example 6

Laminated Optical Film G

A laminated optical film G is obtained in the same way as in the laminated optical film A except for using the following film as the second optical compensation layer.

Second Optical Compensation Layer

A second optical compensation layer was obtained in the same way as in Example 1, except for stretching the film longitudinally by a stretching ratio of 1.63 times and stretching the film transversally by a stretching ratio of 1.63 times. Note that the refractive index ellipsoid of the film had a relationship of nz>nx>ny, and the in-plane retardation $Re_2$ thereof was 50 nm, the thickness direction retardation $Rth_2$ thereof was −80 nm, and the Nz coefficient ($Rth_2/Re_2$) thereof was −1.6.

Liquid Crystal Panel

A liquid crystal panel is obtained in the same way as in Example 1, except for using the laminated optical film G instead of the laminated optical film A.

Figure 11:
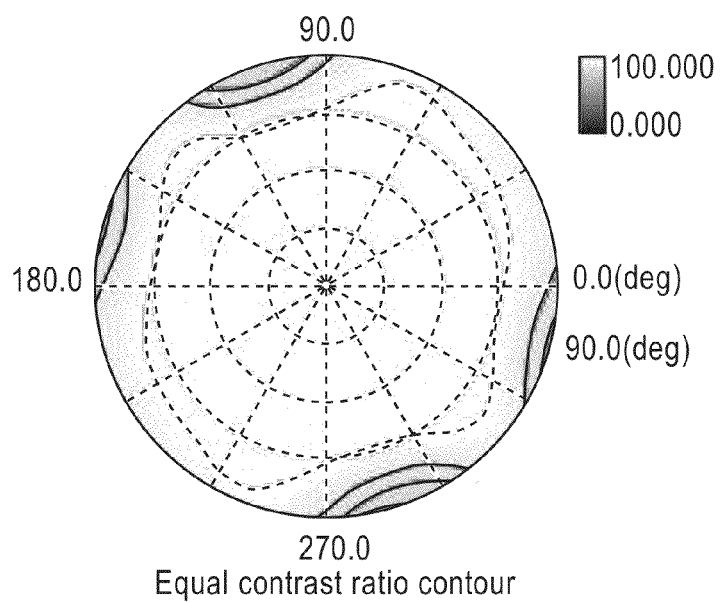
FIG. 11 shows the results of a computer simulation regarding viewing angle dependence of a contrast of a liquid crystal panel in Example 6 of the present invention.

Regarding the viewing angle dependency of a contrast of the liquid crystal display apparatus using the liquid crystal panel, a computer simulation was conducted. FIG. 11 shows the results.

Example 7

Laminated Optical Film H

A laminated optical film H is obtained in the same way as in the laminated optical film C except for using the following film as the second optical compensation layer.

Second Optical Compensation Layer

A second optical compensation layer was obtained in the same way as in Example 1, except for stretching the film longitudinally by a stretching ratio of 1.59 times and stretching the film transversally by a stretching ratio of 1.59 times. Note that the refractive index ellipsoid of the film had a relationship of nz>nx>ny, and the in-plane retardation $Re_2$ thereof was 10 nm, the thickness direction retardation $Rth_2$ thereof was −80 nm, and the Nz coefficient ($Rth_2/Re_2$) thereof was −8.0.

Liquid Crystal Panel

A liquid crystal panel is obtained in the same way as in Example 1, except for using the laminated optical film H instead of the laminated optical film A.

Figure 12:
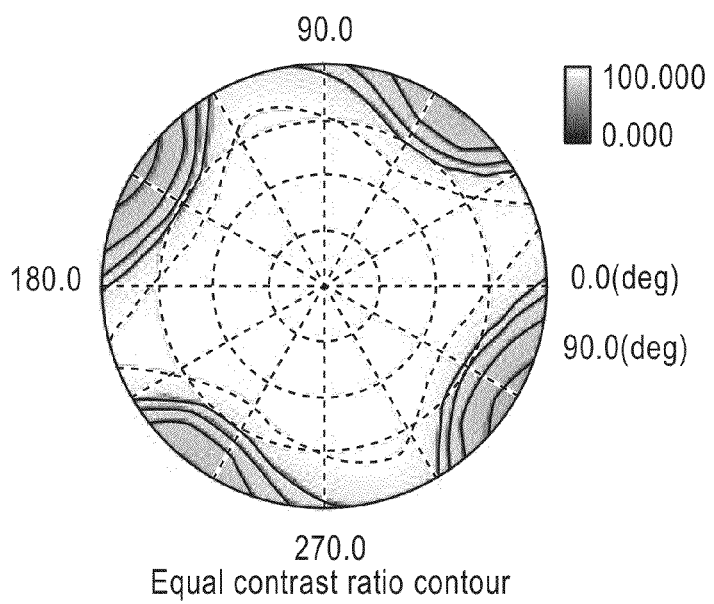
FIG. 12 shows the results of a computer simulation regarding viewing angle dependence of a contrast of a liquid crystal panel in Example 7 of the present invention.

Regarding the viewing angle dependency of a contrast of the liquid crystal display apparatus using the liquid crystal panel, a computer simulation was conducted. FIG. 12 shows the results.

Example 8

Laminated Optical Film I

A laminated optical film I is obtained in the same way as in the laminated optical film C except for using the following film as the second optical compensation layer.

Second Optical Compensation Layer

A second optical compensation layer was obtained in the same way as in Example 1, except for stretching the film longitudinally by a stretching ratio of 1.61 times and stretching the film transversally by a stretching ratio of 1.61 times. Note that the refractive index ellipsoid of the film had a relationship of nz>nx>ny, and the in-plane retardation $Re_2$ thereof was 30 nm, the thickness direction retardation $Rth_2$ thereof was −80 nm, and the Nz coefficient ($Rth_2/Re_2$) thereof was −2.7.

Liquid Crystal Panel

A liquid crystal panel is obtained in the same way as in Example 1, except for using the laminated optical film I instead of the laminated optical film A.

Figure 13:
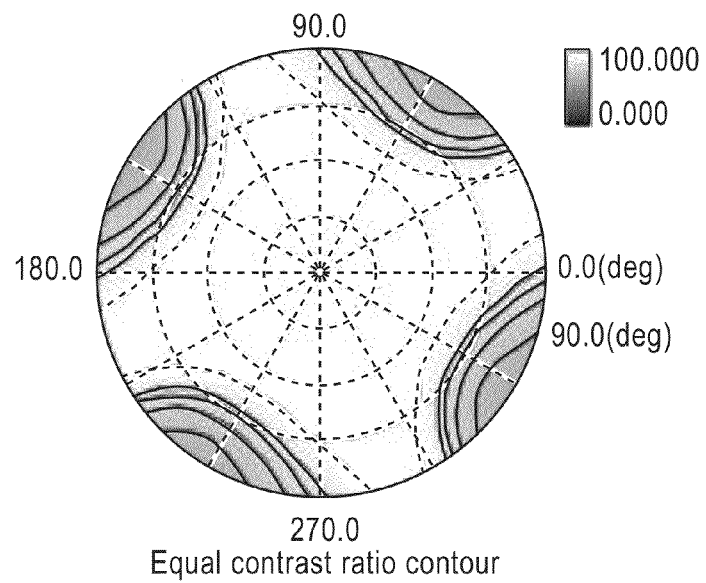
FIG. 13 shows the results of a computer simulation regarding viewing angle dependence of a contrast of a liquid crystal panel in Example 8 of the present invention.

Regarding the viewing angle dependency of a contrast of the liquid crystal display apparatus using the liquid crystal panel, a computer simulation was conducted. FIG. 13 shows the results.

Example 9

Laminated Optical Film J

A laminated optical film J is obtained in the same way as in the laminated optical film C except for using the following film as the second optical compensation layer.

Second Optical Compensation Layer

A second optical compensation layer was obtained in the same way as in Example 1, except for stretching the film longitudinally by a stretching ratio of 1.62 times and stretching the film transversally by a stretching ratio of 1.62 times. Note that the refractive index ellipsoid of the film had a relationship of nz>nx>ny, and the in-plane retardation $Re_2$ thereof was 40 nm, the thickness direction retardation $Rth_2$ thereof was −80 nm, and the Nz coefficient ($Rth_2/Re_2$) thereof was −2.0.

Liquid Crystal Panel

A liquid crystal panel is obtained in the same way as in Example 1, except for using the laminated optical film J instead of the laminated optical film A.

Figure 14:
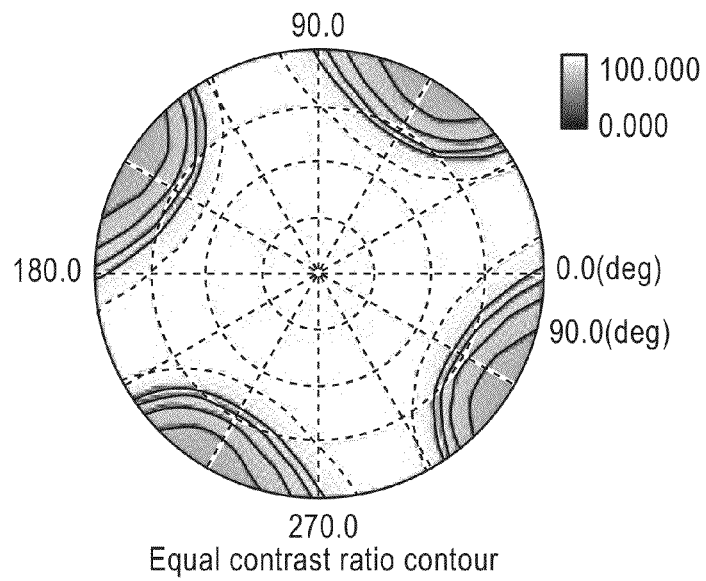
FIG. 14 shows the results of a computer simulation regarding viewing angle dependence of a contrast of a liquid crystal panel in Example 9 of the present invention.

Regarding the viewing angle dependency of a contrast of the liquid crystal display apparatus using the liquid crystal panel, a computer simulation was conducted. FIG. 14 shows the results.

Example 10

Laminated Optical Film K

A laminated optical film K is obtained in the same way as in the laminated optical film C except for using the following film as the second optical compensation layer.

Second Optical Compensation Layer

A second optical compensation layer was obtained in the same way as in Example 1, except for stretching the film longitudinally by a stretching ratio of 1.63 times and stretching the film transversally a stretching ratio of 1.63 times. Note that the refractive index ellipsoid of the film had a relationship of nz>nx>ny, and the in-plane retardation $Re_2$ thereof was 50 nm, the thickness direction retardation $Rth_2$ thereof was −80 nm, and the Nz coefficient ($Rth_2/Re_2$) thereof was −1.6.

Liquid Crystal Panel

A liquid crystal panel is obtained in the same way as in Example 1, except for using the laminated optical film K instead of the laminated optical film A.

Figure 15:
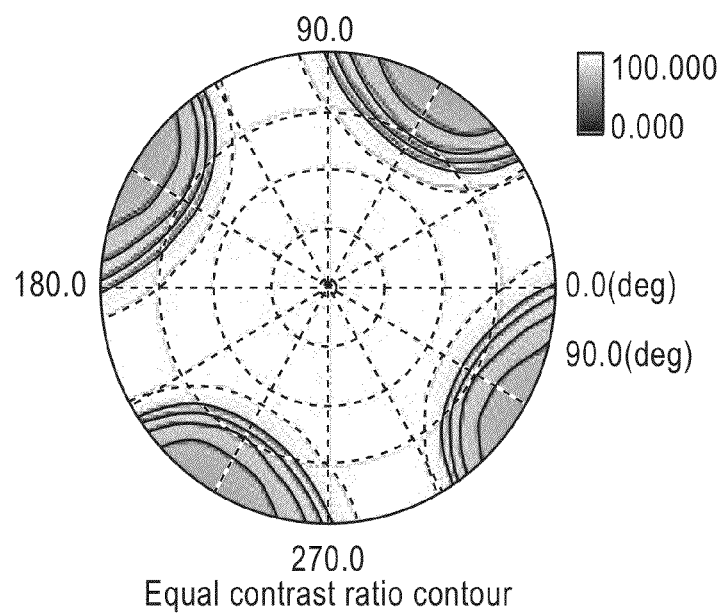
FIG. 15 shows the results of a computer simulation regarding viewing angle dependence of a contrast of a liquid crystal panel in Example 10 of the present invention.

Regarding the viewing angle dependency of a contrast of the liquid crystal display apparatus using the liquid crystal panel, a computer simulation was conducted. FIG. 15 shows the results.

Comparative Example 1

Laminated film L

A laminated film L was obtained in the same way as in the laminated optical film A except that the first optical compensation layer and the second optical compensation layer were not laminated.

Liquid Crystal Panel

A liquid crystal panel was obtained in the same way as in Example 1, except for using the laminated film L instead of the laminated optical film A. Specifically, the lamination was performed so that, in a clockwise direction with the absorption axis of the polarizer on the viewer side being a reference (0°), the slow axis of the fifth optical compensation layer was 45°, the slow axis of the third optical compensation layer was 135°, and the absorption axis of the polarizer on the backlight side was 90°, whereby a liquid crystal panel was produced.

Figure 16:
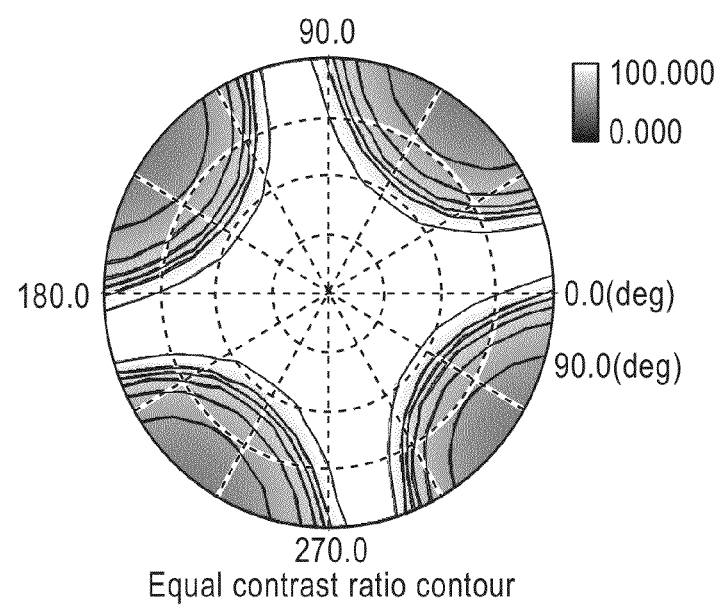
FIG. 16 shows the results of a computer simulation regarding viewing angle dependence of a contrast of a liquid crystal panel in Comparative Example 1.
Figure 17:
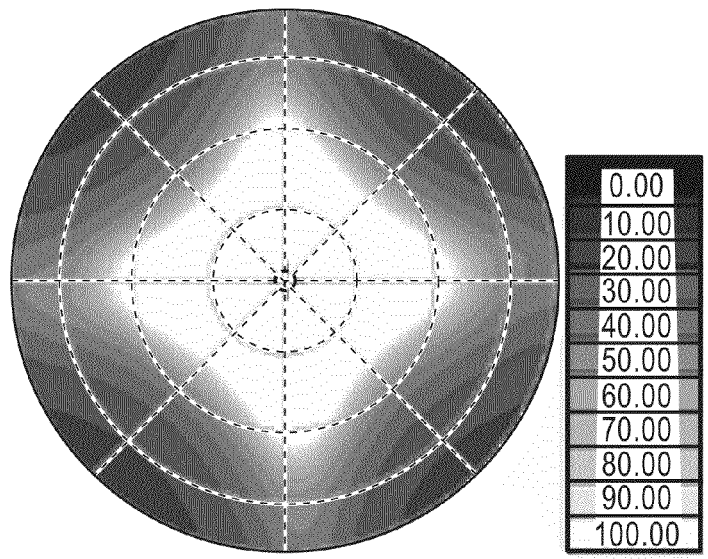
FIG. 17 is a contrast contour map showing viewing angle dependence of a contrast of the liquid crystal panel in Comparative Example 1.

Regarding the viewing angle dependency of a contrast of the liquid crystal display apparatus using the liquid crystal panel, a computer simulation was conducted. FIG. 16 shows the results. Further, an actual measurement of the viewing angle dependency of a contrast of the liquid crystal display apparatus produced using the liquid crystal panel thus obtained was performed. FIG. 17 shows the results.

Comparative Example 2

Laminated Film M

A laminated film M was obtained in the same way as in the laminated optical film A except that the first optical compensation layer was not laminated.

Liquid Crystal Panel

A liquid crystal panel was obtained in the same way as in Example 1, except for using the laminated film M instead of the laminated optical film A. Specifically, the lamination was performed so that, in a clockwise direction with the absorption axis of the polarizer on the viewer side being a reference (0°), the slow axis of the fifth optical compensation layer was 45°, the slow axis of the third optical compensation layer was 135°, the slow axis of the second optical compensation layer was 0°, and the absorption axis of the polarizer on the backlight side was 90°, whereby a liquid crystal panel was produced.

Figure 18:
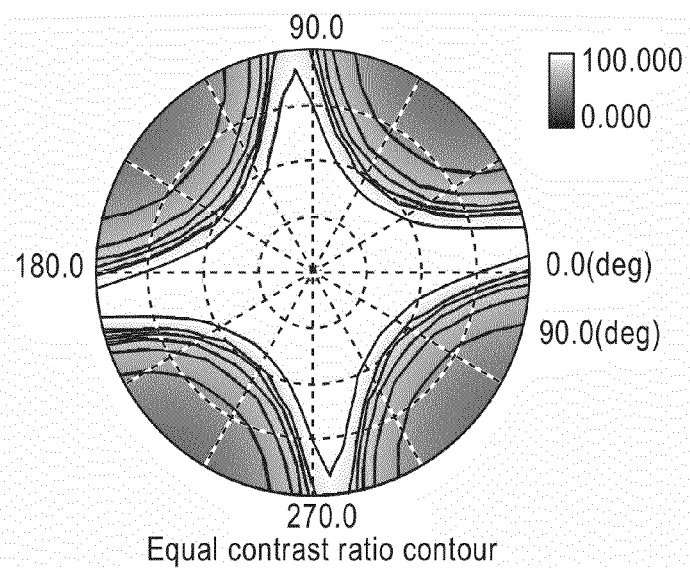
FIG. 18 shows the results of a computer simulation regarding viewing angle dependence of a contrast of a liquid crystal panel in Comparative Example 2.
Figure 19:
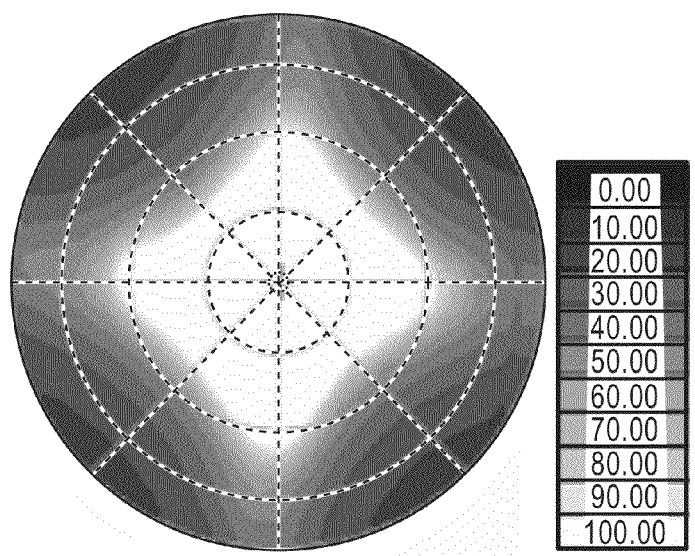
FIG. 19 is a contrast contour map showing viewing angle dependence of a contrast of the liquid crystal panel in Comparative Example 2.

Regarding the viewing angle dependency of a contrast of the liquid crystal display apparatus using the liquid crystal panel, a computer simulation was conducted. FIG. 18 shows the results. Further, an actual measurement of the viewing angle dependency of a contrast of the liquid crystal display apparatus produced using the liquid crystal panel thus obtained was performed. FIG. 19 shows the results.

Comparative Example 3

Laminated Film N

A laminated film N is obtained in the same way as in the laminated optical film C except that the first optical compensation layer was not laminated.

Liquid Crystal Panel

A liquid crystal panel is obtained in the same way as in Example 1, except for using the laminated film N instead of the laminated optical film A. Specifically, the lamination is performed so that, in a clockwise direction with the absorption axis of the polarizer on the viewer side being a reference (0°), the slow axis of the fifth optical compensation layer is 45°, the slow axis of the third optical compensation layer is 135°, the slow axis of the second optical compensation layer is 90°, and the absorption axis of the polarizer on the backlight side is 90°, whereby a liquid crystal panel is produced.

Figure 20:
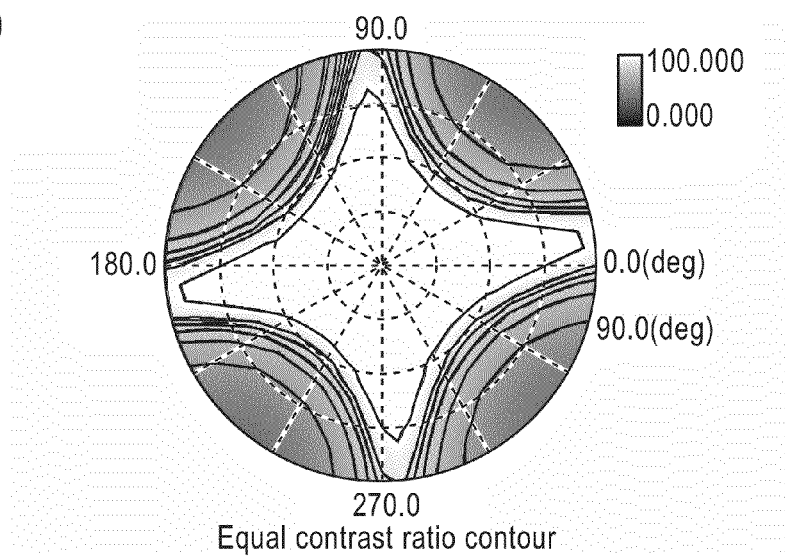
FIG. 20 shows the results of a computer simulation regarding viewing angle dependence of a contrast of a liquid crystal panel in Comparative Example 3.

Regarding the viewing angle dependency of a contrast of the liquid crystal display apparatus using the liquid crystal panel, a computer simulation was conducted. FIG. 20 shows the results.

Contour lines shown in the computer simulation results (FIGS. 4, 6, 8 to 16, 18, and 20) show 100, 50, 40, 30, 20, and 10, respectively, from the inner side.

Table 1 summarizes the whole configuration of the panels in Examples 1 and 2 and Comparative Examples 1 to 3. Table 1 also shows angles (in a clockwise direction) when an angle of the absorption axis of the polarizer on the viewer side was 0°.

TABLE 1

| | Example 1 | | | Example 2 | |
|---|---|---|---|---|---|
| B | Polarizing plate | 0 | B | Polarizing plate | 0 |
| | Fifth optical compensation layer | 45 | | Fifth optical compensation layer | 45 |

TABLE 1-continued

| | | | | | |
|---|---|---|---|---|---|
| A | Re = 140 Rth = 140<br>Sixth optical compensation layer<br>Rth = 120<br>Liquid crystal cell (VA)<br>Fourth optical compensation layer<br>Rth = 120<br>Third optical compensation layer<br>Re = 140 Rth = 140<br>Second optical compensation layer<br>Re = 19 Rth = −80<br>First optical compensation layer<br>Re = 110 Rth = 143<br>Polarizing plate | —<br><br><br><br>—<br><br><br>135<br><br><br>0<br><br><br>0<br><br><br>90 | C | Re = 140 Rth = 140<br>Sixth optical compensation layer<br>Rth = 120<br>Liquid crystal cell (VA)<br>Fourth optical compensation layer<br>Rth = 120<br>Third optical compensation layer<br>Re = 140 Rth = 140<br>Second optical compensation layer<br>Re = 19 Rth = −80<br>First optical compensation layer<br>Re = 110 Rth = 143<br>Polarizing plate | —<br><br><br><br>—<br><br><br>135<br><br><br>90<br><br><br>0<br><br><br>90 |

| | Comparative Example 1 | | | Comparative Example 2 | | | Comparative Example 3 | |
|---|---|---|---|---|---|---|---|---|
| B | Polarizing plate | 0 | B | Polarizing plate | 0 | B | Polarizing plate | 0 |
| | Fifth optical compensation layer<br>Re = 140 Rth = 140 | 45 | | Fifth optical compensation layer<br>Re = 140 Rth = 140 | 45 | | Fifth optical compensation layer<br>Re = 140 Rth = 140 | 45 |
| | Sixth optical compensation layer<br>Rth = 120<br>Liquid crystal cell (VA) | — | | Sixth optical compensation layer<br>Rth = 120<br>Liquid crystal cell (VA) | — | | Sixth optical compensation layer<br>Rth = 120<br>Liquid crystal cell (VA) | — |
| L | Fourth optical compensation layer<br>Rth = 120 | — | M | Fourth optical compensation layer<br>Rth = 120 | — | N | Fourth optical compensation layer<br>Rth = 120 | — |
| | Third optical compensation layer<br>Re = 140 Rth = 140 | 135 | | Third optical compensation layer<br>Re = 140 Rth = 140 | 135 | | Third optical compensation layer<br>Re = 140 Rth = 140 | 135 |
| | — | — | | Second optical compensation layer<br>Re = 19 Rth = −80 | 0 | | Second optical compensation layer<br>Re = 19 Rth = −80 | 90 |
| | — | — | | — | — | | — | — |
| | Polarizing plate | 90 | | Polarizing plate | 90 | | Polarizing plate | 90 |

As is apparent from FIGS. 4 to 20, the liquid crystal panels in Examples 1 to 10 of the present invention were excellent in contrast, compared with those in Comparative Examples 1 to 3. Further, it was confirmed that the liquid crystal panels in the examples of the present invention have a color shift smaller than that of the liquid crystal panels in the comparative examples.

The liquid crystal panel and the liquid crystal display apparatus of the present invention can be favorably applied to a mobile telephone, a personal digital assistant (PDA), a liquid crystal television, a personal computer, and the like.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A laminated optical film, comprising:
   a polarizer;
   a first optical compensation layer which has a refractive index ellipsoid showing a relationship of nx>ny>nz; and
   a second optical compensation layer which has a refractive index ellipsoid showing a relationship of nz>nx>ny,
   wherein the polarizer and the first optical compensation layer are placed so that an absorption axis of the polarizer is parallel to or perpendicular to a slow axis of the first optical compensation layer, and
   the polarizer and the second optical compensation layer are placed so that an absorption axis of the polarizer is parallel to or perpendicular to a slow axis of the second optical compensation layer, and
   wherein an in-plane retardation $Re_2$ of the second optical compensation layer satisfies a relationship of 0 nm<$Re_2$≤70 nm.

2. A laminated optical film according to claim 1, wherein an Nz coefficient of the second optical compensation layer is −1.0 or less.

3. A laminated optical film according to claim 1, further comprising a third optical compensation layer which has a refractive index ellipsoid showing a relationship of one of nx>ny=nz and nx>ny>nz.

4. A laminated optical film according to claim 3, wherein an in-plane retardation $Re_3$ of the third optical compensation layer is 80 to 200 nm.

5. A laminated optical film according to claim 1, further comprising a fourth optical compensation layer which has a refractive index ellipsoid showing a relationship of nx=ny>nz.

6. A liquid crystal panel comprising a liquid crystal cell and the laminated optical film according to claim 1.

7. A liquid crystal panel according to claim 6, wherein the liquid crystal cell is in a VA mode.

8. A liquid crystal display apparatus comprising the liquid crystal panel according to claim 6.

* * * * *